(12) United States Patent
White et al.

(10) Patent No.: US 8,243,570 B2
(45) Date of Patent: Aug. 14, 2012

(54) SYSTEM AND METHOD FOR COMBINING PRE-MASTERED ERRORS WITH MARKS OR PRINTED SPOTS ON OPTICAL MEDIA

(75) Inventors: James Mitchell White, Niskayuna, NY (US); Marc Brian Wisnudel, Glen Rock, NJ (US); Kasiraman Krishnan, Clifton Park, NY (US)

(73) Assignee: NBCUniversal Media, LLC, Wilmington, DE (US)

( * ) Notice: Subject to any disclaimer, the term of this patent is extended or adjusted under 35 U.S.C. 154(b) by 763 days.

(21) Appl. No.: 12/270,272

(22) Filed: Nov. 13, 2008

(65) Prior Publication Data

US 2010/0118674 A1    May 13, 2010

(51) Int. Cl.
*G11B 7/00* (2006.01)
(52) U.S. Cl. .................. 369/53.21; 369/53.35
(58) Field of Classification Search ............... 369/53.15, 369/53.17, 53.21, 284, 53.35, 53.16, 59.25, 369/124.07
See application file for complete search history.

(56) References Cited

U.S. PATENT DOCUMENTS

| | | | |
|---|---|---|---|
| 5,166,041 A | 11/1992 | Murofushi | |
| 5,395,862 A | 3/1995 | Neckers | |
| 5,451,343 A | 9/1995 | Neckers | |
| 5,706,266 A * | 1/1998 | Brownstein et al. | 369/53.21 |
| 5,815,484 A * | 9/1998 | Smith et al. | 369/275.1 |
| 5,990,188 A | 11/1999 | Patel | |
| 6,747,930 B1 * | 6/2004 | Weldon et al. | 369/53.21 |
| 6,952,392 B2 | 10/2005 | Vig | |
| 7,058,977 B1 * | 6/2006 | Furukawa et al. | 726/26 |
| 7,127,066 B2 | 10/2006 | Solomon | |
| 2001/0028615 A1 * | 10/2001 | Carson et al. | 369/47.12 |
| 2003/0112737 A1 * | 6/2003 | Thompson et al. | 369/284 |
| 2003/0147339 A1 * | 8/2003 | Selinfreund et al. | 369/275.3 |
| 2004/0004922 A1 * | 1/2004 | Selinfreund et al. | 369/53.21 |
| 2004/0152017 A1 | 8/2004 | Vig | |
| 2004/0152127 A1 | 8/2004 | Potyrailo | |
| 2007/0020560 A1 | 1/2007 | Larson | |
| 2007/0122735 A1 * | 5/2007 | Wisnudel | 430/270.1 |

FOREIGN PATENT DOCUMENTS

WO      WO97/21737      6/1997
WO      WO 2007/064526 A2      6/2007

OTHER PUBLICATIONS

U.S. Appl. No. 12/059,943, filed Mar. 31, 2008, Chan et al.
U.S. Appl. No. 12/105,821, filed Apr. 18, 2008, Gascoyne et al.

* cited by examiner

*Primary Examiner* — Thomas Alunkal
(74) *Attorney, Agent, or Firm* — Fletcher Yoder P.C.

(57) ABSTRACT

An optical article for playback in a player, the optical article including at least one sector having data, and a mark disposed in a predetermined relationship with the at least one sector, wherein the mark renders a portion of the data generally unreadable. The optical article further includes error correction code associated with the at least one sector, wherein data within the error correction code is configured as partially corrupted. The inclusion of partially corrupted error correction code reduces the size of the mark or spot required to render the data sector uncorrectable.

32 Claims, 14 Drawing Sheets

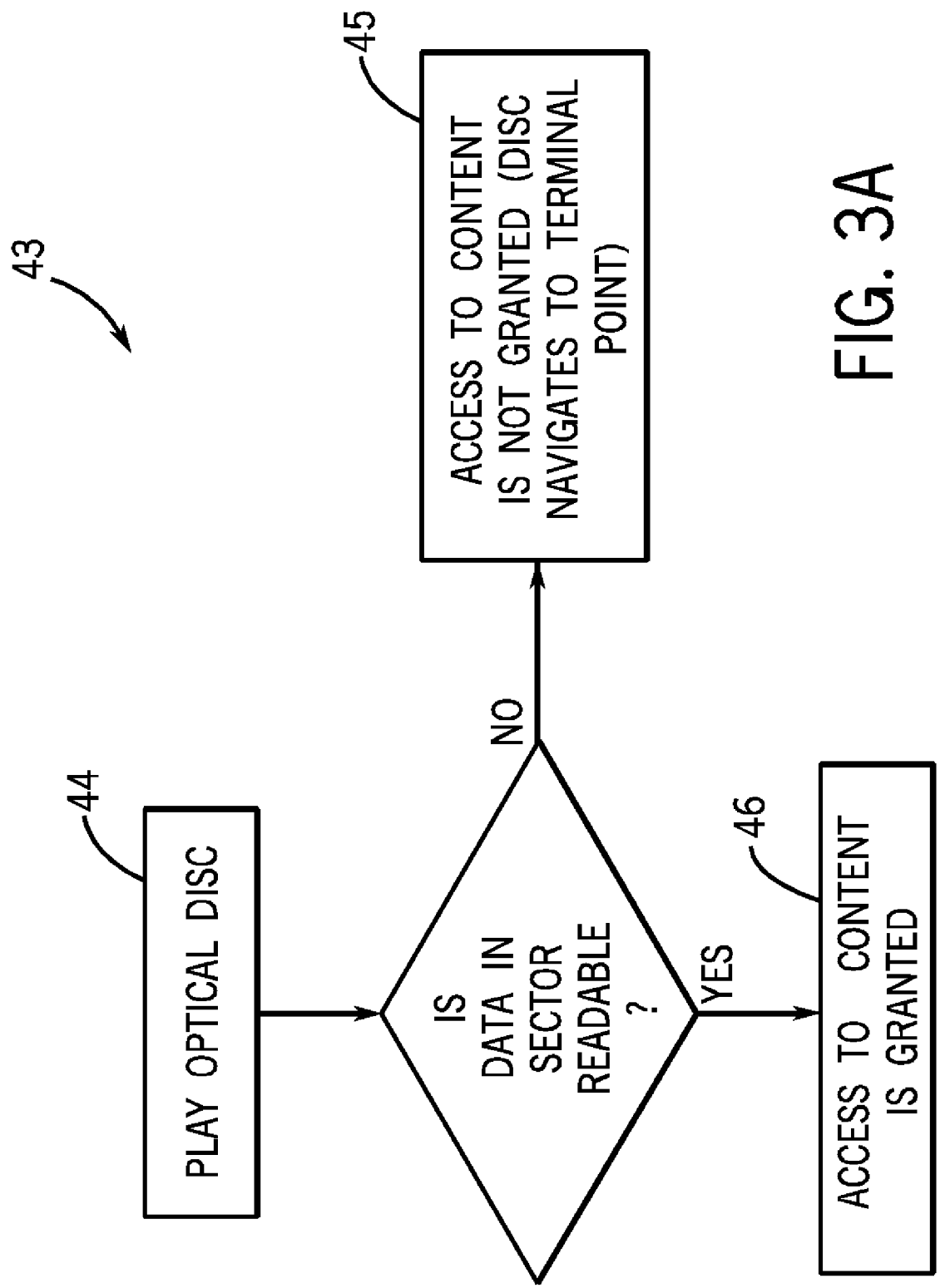

SYSTEM AND METHOD FOR COMBINING PRE-MASTERED ERRORS WITH MARKS OR PRINTED SPOTS ON OPTICAL MEDIA

BACKGROUND

The present invention relates generally to an optical article for playback in a player. More specifically, the invention relates to combining pre-mastered errors and printed marks or spots on an optical article.

The popularity of optical articles or optical storage devices, such as compact discs (CD) and digital versatile discs (DVD), has grown rapidly since its introduction. When compared to other competitive storage media types, the accessibility of data, fidelity, low manufacturing cost, reduced size and other features have made optically-readable media, such as CDs, DVDs, and Blu-ray discs, an overwhelming choice for manufacturers and users alike. As a result, a great variety of information may be stored on the optical articles, such as feature films, advertisements, audio or video trailers, and others.

Shoplifting is a major problem for retail venues. Relatively small objects, such as CDs, DVDs, and Blu-ray discs are common targets as they can be easily hidden and carried out of the retail stores without being noticed. Retailers incur monetary losses because of such instances.

Consumer products may be equipped with theft-deterrent packaging. For example, clothing, CDs, audiotapes, DVDs and other high-value items are occasionally packaged along with tags that set off an alarm if the item is removed from the store without being purchased. These tags are engineered to detect and alert for shoplifting. For example, tags commonly used to secure against shoplifting are the Sensormatic® electronic article surveillance (EAS) tags based on acousto-magnetic technology. RFID tags are also employed to trace the items on store shelves and warehouses. Other theft-deterrent technologies currently used for optical discs include hub caps for DVD cases that lock down the disc and prevent it from being removed from the packaging until it is purchased, and "keepers" that attach to the outside of the DVD case packaging to prevent the opening of the package until it is purchased. In some cases, retailers have resorted to storing merchandise in locked glass display cases. In other stores, the DVD cases on the shelves are empty, and the buyer receives the actual disc only when purchased. Many of these approaches are not appealing because they add an additional inconvenience to the buyer or retailer, or they are not as effective at preventing theft as desired. Optical storage media, in particular, pose an additional problem in that their packaging and the sensor or anti-theft tags may be easily removed.

BRIEF DESCRIPTION

An aspect of the present technique provides for an optical article for playback in a player, the optical article including: at least one sector having data; a mark disposed in a pre-determined relationship with the at least one sector, wherein the mark renders a portion of the data unreadable; and error correction code associated with the at least one sector, wherein data within the error correction code associated with the at least one sector is configured as partially corrupted. A "pre-determined relationship" may refer to the mark being printed on the surface of the disc, effectively inhibiting the data located directly in the optical path of the laser from being read. The mark may be located in the proper position on the disc surface such that the portion of the data track containing data within the specified sector is obscured. The mark may be disposed above any specified portion of the sector, which is divided and spread over a large linear distance on the disc and is interleaved among portions of other sectors.

Another aspect of the present technique provides for an optical article for playback in a player, the optical article including: at least one sector having a command; a mark disposed on the at least one sector, wherein the mark renders the command unreadable; and error correction code associated with the at least one sector, wherein data within the error correction code associated with the at least one sector is configured as partially corrupted.

Yet another aspect of the present technique provides for a method of manufacturing an optical article for playback in a player, including: providing data on at least one sector of the optical article; providing error correction code on the optical article, wherein at least a portion of the error correction code is associated with the at least one sector; corrupting data within the error correction code associated with the at least one sector with an uncorrectable error; and disposing a mark on the at least one sector, wherein the mark renders the data of the at least one sector unreadable.

DRAWINGS

These and other features, aspects, and advantages of the present invention will become better understood when the following detailed description is read with reference to the accompanying drawings in which like characters represent like parts throughout the drawings, wherein.

Figure 3B:
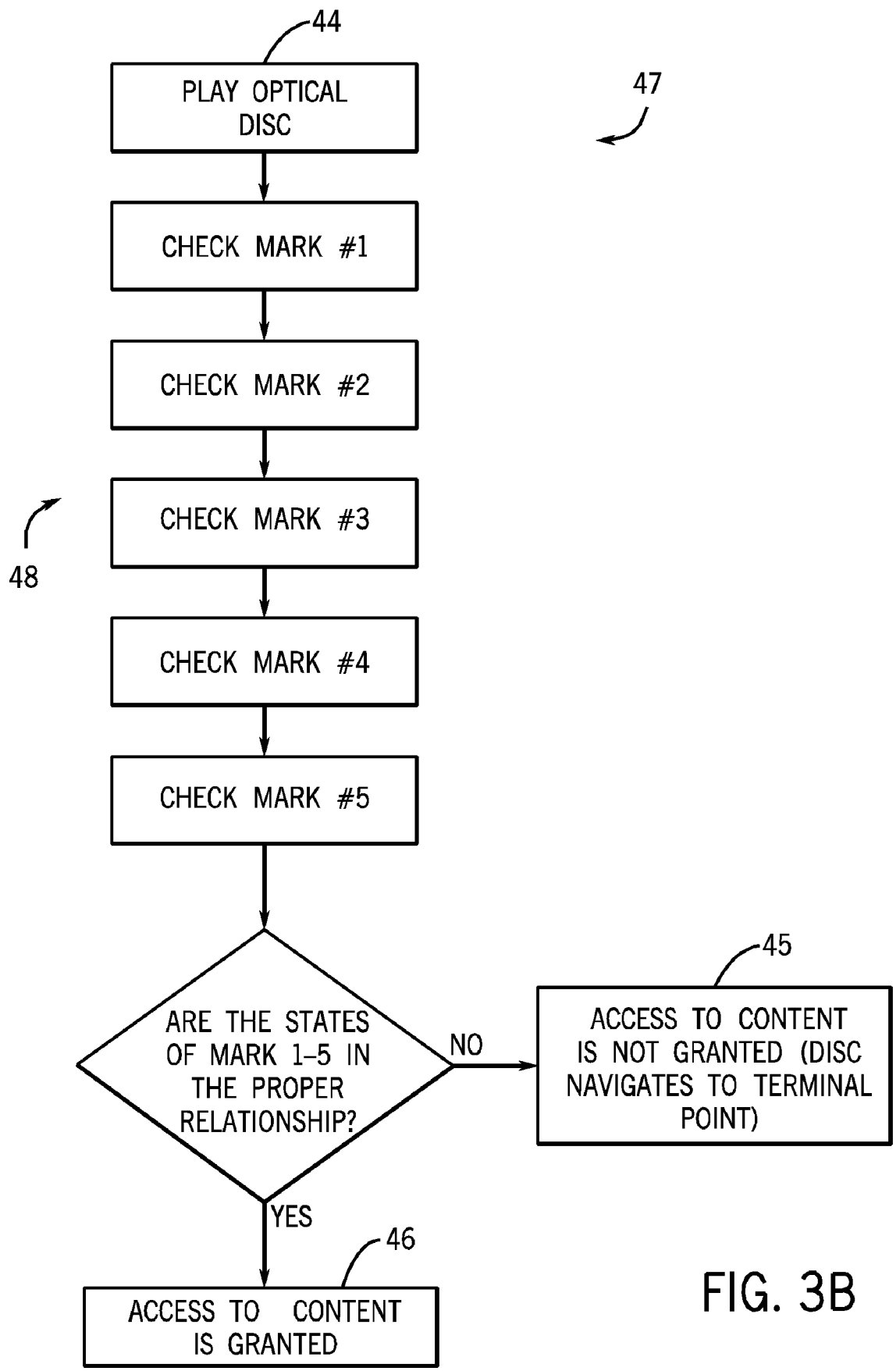
Figure 3C:
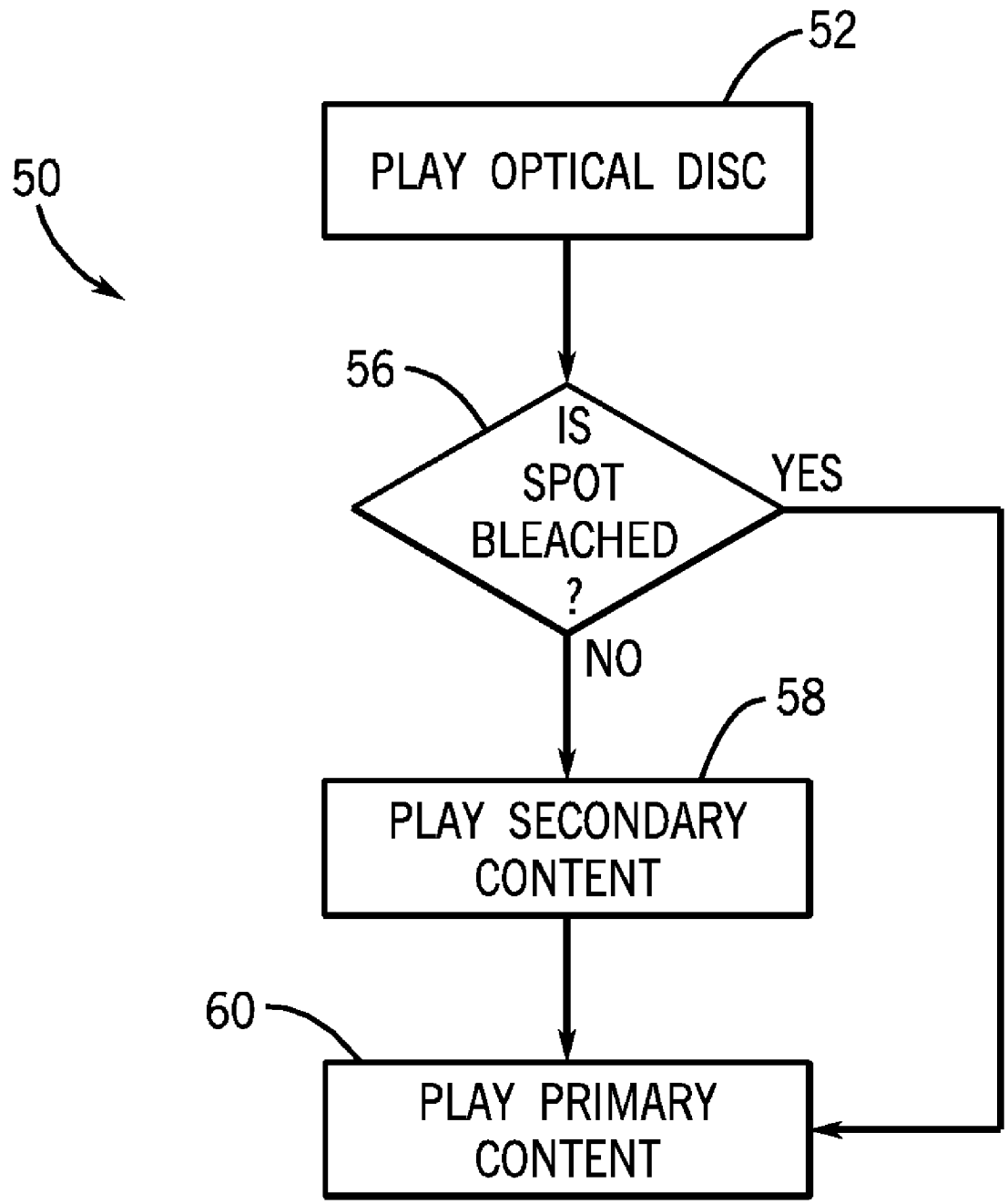

FIGS. 3A, 3B, and 3C are block diagrams of methods of playback of an optical article (e.g., DVD) in an optical media player (e.g., DVD player) in accordance with embodiments of the present technique;

FIGS. 4-7 are graphical schematics of observed responses to various levels of pre-mastered errors in accordance with embodiments of the present technique; and FIGS. 8-12 are diagrammatical representations of corruption schemes of error correction code in accordance with embodiments of the present technique.

DETAILED DESCRIPTION

While only certain features of the invention have been illustrated and described herein, many modifications and changes will occur to those skilled in the art. It is, therefore, to be understood that the appended claims are intended to cover all such modifications and changes as fall within the true spirit of the invention.

The present technique encompasses an optical article for playback in an optical media player. The technique combines pre-mastering errors and marks or printed spots (and their design) to more precisely obscure sectors on the optical article to facilitate universal behavior in players with regard to the printed spots. The technique may also combine pre-mastered errors and printed spot patterns to allow a "switchable" logic to be programmed onto a disc. This technique facilitates substantially universal behavior on most player models and computer drives. Relevant factors that are balanced include, but are not limited to, the magnitude of pre-mastered error, the printed spot design, and the location of the printed spot relative to the physical location of the corrupted data on the disc.

Applications of the technique may include security, content customization, limited play, and so on.

For example, a newer approach to theft prevention of optical media is related to "benefit denial," which refers to producing the optical media in such a way that, when on the shelf the media is not functional in a player. Only when it is activated at the point-of-sale can it be played. Strategies known in the art are to print marks or spots at the lead-in area of the disc to block access of the DVD reader to the lead-in data and prevent startup of the disc. At the point-of-sale, the mark is bleached and the disc is activated. This strategy is somewhat limited in utility because it is relatively easy for a thief to employ the activation technique to bleach a single mark at the lead-in area. An improved strategy relates to marking the data area of the disc in a way that can be read by the player. The disc is programmed such that if the markings are not in the proper configuration, the disc will not play. In this case, if the marks are improperly activated, the disc will still not play. Effectively, a "code" must be physically translated to the disc at the point-of-sale. This code is known to legitimate activation hardware but is not readily discerned by a thief.

The technology described herein describes a system and method for combining pre-mastered errors with printed marks or spots on the optical article. In combination with authoring techniques that are known in the art, this technique allows for improved performance of a player code security optical article, including substantially universal behavior among players in the marketplace. The technique may also be applied to customization of media after replication, and to facilitate limited play content such that a portion of the content on a disc may be made to be limited play, while the remainder of the content is accessible through the lifetime of the optical article.

Limited-play optical articles known in the art provide limited access to the complete content contained in the optical articles. It is desirable, however, to have a limited-play optical article, where part of the content may have unlimited access. In other words, it may be beneficial that a portion of the content is accessible throughout the lifetime of the optical article, and a portion of the content may have limited access. The present technique provides an improved solution to the long-standing problem.

An aspect of the present technique provides for an optical article for playback in a player, the optical article including: at least one sector having data; a mark disposed in a pre-determined relationship with the at least one sector, wherein the mark renders a portion of the data unreadable; and error correction code associated with the at least one sector, wherein data within the error correction code associated with the at least one sector is configured as partially corrupted. A "pre-determined relationship" may refer to the mark being printed on the surface of the disc, effectively inhibiting the data located directly in the optical path of the laser from being read. The mark may be located in the proper position on the disc surface such that the portion of the data track containing data within the specified sector is obscured. The mark may be disposed above any specified portion of the sector, which is divided and spread over a large linear distance on the disc and is interleaved among portions of other sectors.

I. Introduction

An optical media or optical article generally refers to an article that includes an optical data layer for storing data. The stored data may be read by, for example, an incident laser of an optical data reader device such as a standard compact disc (CD) drive or digital versatile disc (DVD) drive as are commonly found in most computers and home entertainment systems. Further, the optical article may have one or more data layers. Examples of optical articles include a compact disc (CD); a digital versatile disc (DVD); multi-layered structures, such as DVD-5 or DVD-9; multi-sided structures, such as DVD-10 or DVD-18; a high definition digital versatile disc (HD-DVD); a Blu-ray disc; a near field optical storage disc; a holographic storage medium; and a volumetric optical storage medium, such as, a multi-photon absorption storage format. A first surface of the optical article may incorporate polycarbonate. Moreover, the optical article may be an identification card, a passport, a payment card, a driver's license, a personal information card, or any other documents or devices, and so on, which employ an optical data layer for data storage.

In embodiments of the present technique, a spot or mark is applied or printed to an optical article (e.g., Blu-ray disc, DVD or CD) to obscure access to portions of the data on the optical article. In some examples, the mark may be permanent or irreversible (e.g., without an optical state-change material or a change of state). In other instances, the spot or mark may contain an optical state-change material, where the spot is initially reversible (e.g., upon exposure to light), and then becomes bleached and irreversible after exposure to the light.

In the former case, the spot or mark may be permanent from the outset. Thus, advantageously, certain data on the optical article may never be read by the typical optical media player. This may be beneficial, for example, in applications where an optical article is mass-produced with a variety of data, optional data, and so on, and depending on the retail price, retail location, particular purchaser, security requirements, etc., portions of the data are desirably permanently obscured. One example is to have digital content (e.g., movie) provided in several different languages on a DVD or CD, and to then to use a permanently printed mark to specify the default language, depending on the geography of the sale of the CD or DVD, for example. In another example, DVD's may be mass-produced to contain numbers (e.g., lottery numbers), codes (e.g., for security or identification), data, and the like, and then particular numbers or codes are encoded on the particular DVD's with the printed spot or mark. In general, such an approach may reduce manufacturing costs by providing for mass-production of standard information or a variety of data on all DVD's or CD's during a particular manufacturing run, and then to print marks on the discs to disallow access to certain information or data on particular DVD's or CD's. In this case, the discs may be customized at a printing step instead of at the mastering step, which can dramatically reduce costs.

In certain instances where, for example, the mark or spot is either initially reversible (e.g., bleachable), the present technique is generally directed to configuring the optical media or article (e.g., optical disc) to become activated in response to external stimuli. In one example, commands on the optical disc to change a data storage register in the player are obscured by a mark (e.g., printed spot) containing a dye that can change state to allow for a disc to respond to stimuli at the point-of-sale. For example, the printed spot may include bleachable dye that is bleachable by heat, light, or electric potential provided by hardware at the point-of-sale. In this case, when the spot is dark (unbleached), the command to change the storage register is not readable, and the storage register will remain at its default value. When the spot is light (bleached), the command to change the storage register is readable, and the storage register will be changed to its non-default value. If the process is repeated for a plurality of optically detectable marks on the article, the player can read a binary code that is determined by the state of the bleachable marks. The disc can be programmed to give access to the content if the marks are bleached in the correct configuration (i.e., proper combination of marks are bleached), and to deny access if the marks are not bleached in the correct configuration. On the other hand, as discussed, the printed spot may not incorporate an optical state-change material, but instead permanently obscure data from the outset. Non-limiting examples of this may be to selectively damage small portions of the article with heat, intense light, or solvent that may chemically haze the material.

In certain instances where the mark or spot is initially reversible (e.g., bleachable), the present technique is generally directed to configuring the optical media or article (e.g., optical disc) to be changeable, or to change in response to external stimuli (i.e., from the player and not the user). In one example, logical navigation commands on the optical disc are obscured by a mark (e.g., printed spot) containing a dye that can change state to allow for a disc to respond to stimuli (e.g., laser of the optical media player). For example, the printed spot may include bleachable dye that is bleachable by the laser of the optical media player. In this case, when the spot is dark (unbleached), the navigation data is not readable, and the disc will not initially read the navigation data but instead proceed to secondary content (e.g., limited-play content, such as a trailer or advertisement). When the spot is bleached, the navigation data is readable, and the disc will initially read the navigation data (e.g., which may direct to a menu or to primary content, such as a movie) and skip the secondary content. Thus, in this example, the logic changes state upon exposure of the mark to the laser light in the player, allowing for the disc to play in one sequence during the first play, and to play differently on subsequent plays.

However, employment of a printed mark or spot (with or without an optical-state change material) to obscure data, a command, and so on, by itself may not elicit the desired behavior universally in most or all manufactured optical media players. This may be due to optical discs generally having robust error correction mechanisms, as discussed below. Unfortunately, in some instances (i.e., without an intentional corruption of error correction code as discussed below), a spot printed on the disc should be relatively large to overcome the standard error correction. It should be explained that a printed spot can obscure the data by blocking the ability of the laser to read the data directly under the spot, and also by obscuring the data "downstream" of the spot due to the player temporarily losing tracking on the disc after passing over the spot. Moreover, most players on the marketplace behave differently both in response to an unreadable sector on the disc and time to respond to tracking problems during playback. While an effective balance between spot size/design, error correction, and player tracking response may be determined for a particular model of player, it is difficult to balance these factors to make the desired impact of the permanent mark or unbleached/bleached mark on behavior of the disc and player universal for most or all players currently on the market.

Additionally, a large printed spot may cover sectors of data (other than desired sectors) due to the relatively low precision/accuracy in large scale industrial printing, for example. Thus, unfortunately, in addition to obscuring the sector of interest on the optical media or article, the large printed spot may also obscure many other sectors, rendering them uncorrectable. For certain players and computer drives, a large number of corrupted sectors may cause long readout delays or catastrophic failures such as crashing of the disc in the player.

Furthermore, in the case of photobleachable spots, as indicated above, it may be desirable to use the laser beam in the DVD player to bleach the spot. To bleach with increased efficiency, the defocused laser beam should touch the spot during playback. An example is locating of the secondary content (e.g., limited-play content such as trailers) underneath the printed spot on layer 1 of the DVD. The navigation logic is located on layer 0 just above the trailer content, and the bleachable spot is located on the surface of the disc above both the logic and trailers. Upon the first play, the disc is not able to read the navigation logic and the player is directed to play the trailers. During the trailer playback, the beam touches the spot and bleaches it. This may be referred to as "underneath bleaching" and is one strategy to increase the bleaching time and facilitate that the spot is bleached in a single play of the disc. Unfortunately, if there is a large spot pattern on the disc, the video data for the trailers on layer 1 may also be corrupted and the player will skip or potentially crash during the playback of the trailers. Thus the "underneath bleaching" methodology may not be possible with large printed spots.

As explained more fully below, to address the aforementioned opportunities and problems, the present technique utilizes: (1) an intentional partial corruption of the standard error correction code (associated with the sector having the mark) with pre-mastered errors; and (2) a mark (e.g., permanent mark or printed spot) with or without an optical state-change material disposed on the optical article (CD, DVD, etc.). These intentional pre-mastered errors may be labeled as correctable/uncorrectable corruptions, resolvable/non-resolvable values, sectors with non-recoverable parity mismatches, and so forth.

It should be noted that the pre-mastered errors are uncorrectable, non-resolvable, non-recoverable, etc, when the pre-mastered error is combined with a spot or mark that does not permit the light of the optical media laser to be transmitted to the data layer of the article (i.e., a permanent mark, a non-bleached spot, and so on). Typically, the pre-mastered error by itself is not enough to make the error uncorrectable. It is the pre-mastered error combined with the printed spot that makes the error uncorrectable. A benefit of this combination approach is that a smaller spot can be printed. For a permanent or "irreversible" spot, the error remains uncorrectable. For a "reversible" spot, the error becomes correctable when the spot is "reversed." A spot may be reversed or altered (e.g., bleached, lightened, changed color, etc.) in response to external stimuli, such as in response to light, heat, electrical potential, and so forth.

In one example, a sector of the optical article is partially corrupted with a pre-mastered error. At this point, the sector is correctable. Second, a mark or spot is printed (in the appropriate location relative to the sector having the pre-mastered error) to make data of the sector underneath the spot unreadable. The deletion of data via the printed mark or spot, combined with the pre-mastered error, makes the errors in the sector uncorrectable, as desired. For a permanent spot that is not reversible or changeable, the error will remain uncorrectable for the entire lifetime of the optical article. For a reversible or changeable spot, the error becomes correctable upon reversing the spot (upon altering the appropriate property of the spot). For different types of reversible or changeable spots, various properties of the spot may be altered in response to various stimuli (such as to light, heat, electrical potential, and the like). The altered properties may include bleaching of the spot, changing color of the spot, lightening the spot, and so on.

Figure 1:
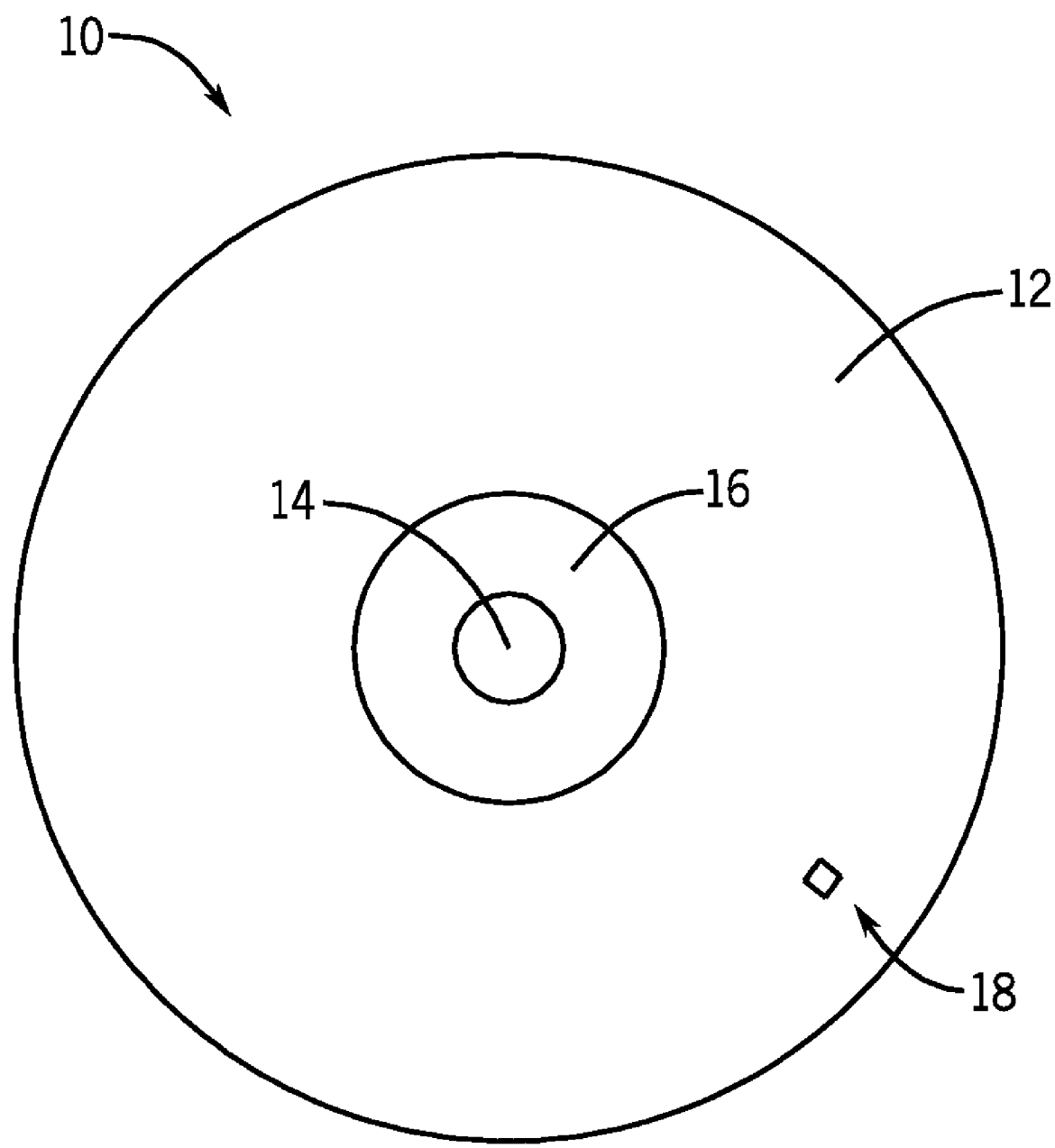
FIG. 1 is a diagrammatical representation of an optical article (e.g., CD or DVD) having a printed mark pattern in accordance with one embodiment of the present technique.

Referring to FIG. 1, an optical article 10 is depicted. An example of an optical article 10 is a CD, DVD, or Blu-ray disc. On the optical article 10, digital content is disposed on the surface 12. The optical article 10 may also have an insert hole 14 for installation into an optical media player, for example. Further, an insert or blank area 16 may surround the hole 14. Lastly, a printed mark pattern 18 may be disposed at one or more locations on the surface 12. The number of marks per pattern 18 may vary, depending on the size of the marks, and the amount and type of corruption of the error correction code, for example. Lastly, the spot or mark pattern 18 may share the same radial curvature as the surface 12 of the optical article 10, and be disposed at various distances along the radius of the optical article 10.

Figure 2:
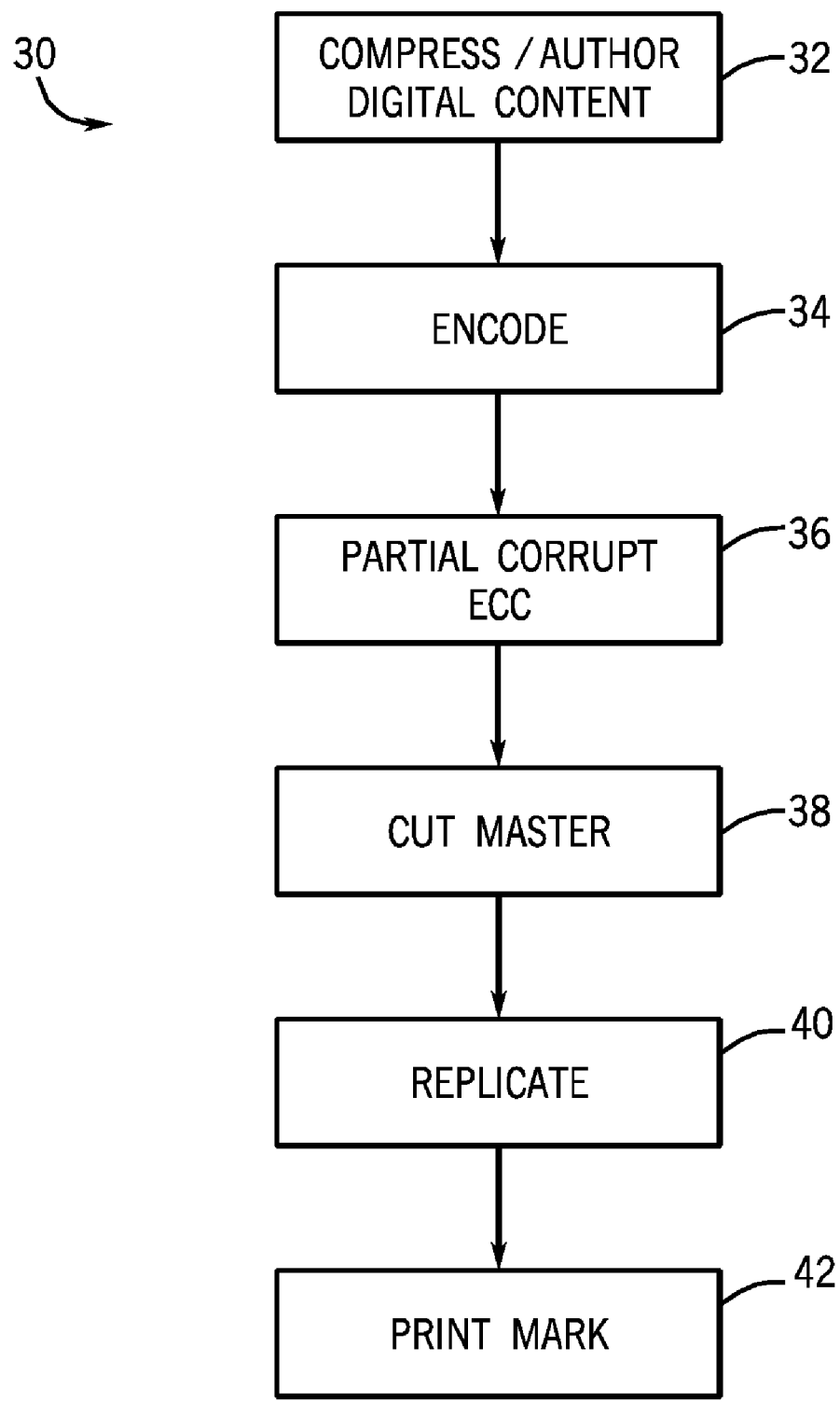
FIG. 2 is a block diagram of a method for manufacturing an optical article (e.g., DVD) in accordance with one embodiment of the present technique.

FIG. 2 depicts a method 30 for fabricating an optical article 10 (e.g., DVD) in accordance with one embodiment of the present technique. Initially, digital content, such as movie content, may be compressed and authored into a compressed data and logical structure, as indicated by reference numeral 32. This compressed data and logical structure may then be encoded or converted into "DVD language," as referenced by block 34. It should be noted that in the encoding 34 step, the output of an encoder may be to a laser beam recorder which cuts the data into a glass master that is eventually converted into a metal stamper used to make the DVD. Moreover, the encoding step 34 is where error correction code may be implemented in the DVD language. It should also be noted that step 34 may be considered a pre-mastering step. In accordance with the present technique, the data within the error correction code may be intentionally corrupted in step 34 with a "pre-mastered error", as indicated by reference numeral 36. See Sections III and VI below for further discussion of corrupting the error correction code.

The DVD language, which may be from the glass master, for example, is then formed into a metal stamper, for example, as indicated by reference numeral 38. This metal stamper may then used to replicate multiple plastic DVDs as indicated by reference numeral 40. The content mass is produced with physical pits and lands on the plastic DVDs. Lastly, a mark or spot may be printed on each individual plastic DVD, as indicated by reference numeral 42. The mark or spots may incorporate optical state change material, such as a bleachable dye.

FIG. 3A depicts a method 43 for playing an optical article 10 (e.g., optical disc) in accordance with one embodiment of the present technique. The optical disc may be printed, for example, with one spot having an optical state-change material such as a bleachable dye. Initially, the spot is in the dark or unbleached state. In this case, when the disc is placed in a player (block 44), certain data cannot be read and the disc is programmed to direct the player to a terminal navigation point and access to the feature content on the disc is denied (block 45). When the optical article is activated at the point-of-sale, however, the mark is changed to a light or transparent optical state and in this case the data is readable. The disc is programmed to direct the player to the feature content on the disc and thus access is enabled (block 46). FIG. 3B depicts a slightly more complicated method than FIG. 3A involving multiple spots or marks (reference numeral 48) that must be changed in state in the correct combination in order for access to the feature content on the optical article to be granted.

FIG. 3C depicts a method 50 for playing an optical article 10 (e.g., optical disc) in accordance with one embodiment of the present technique. Initially, the optical disc may be placed into an optical media player to play the optical disc, as indicated by reference numeral 52. The optical disc may have one or more marks or spots having an optical state-change material such as a bleachable dye. The marks or spots may be disposed on sectors of the optical disc to obscure navigation data, for example. In step 56, if the spot is not bleached, then secondary content, such as limited-play content, is played, as indicated by reference numeral 58. Then, navigation data or primary content, such as the movie, is played, as indicated by reference numeral 60. However, if the spot is bleached, then the limited-play content (e.g., a trailer) is bypassed and not played, and the navigation data primary content is directly played (block 60). Lastly, it should be emphasized that FIG. 3 depicts an embodiment of the present technique, and is not meant to be limiting. For example, other aspects of the present technique may provide for a permanent mark that does not contain an optical state-change material.

II. Mark on Optical Article

In embodiments of the present technique, the optical article includes one or more marks (e.g., printed spot). The mark may not contain an optical state-change material, be irreversible from the outset, and permanently obscure data on the optical article. On the other hand, the mark may contain an optical-state change material disposed on the sector, wherein the mark is in one of a first optical state or a second optical state.

As used herein the term "optical state change" material is used to describe a material which is capable of existing in at least two different forms, each form possessing a unique optical state, for example a unique wavelength associated with a maximum optical absorbance within a range from about 200 nm to about 800 nm, or a unique extinction coefficient at a specific wavelength between about 200 nm to about 800 nm.

In one embodiment, the optical state change material is selected from one or more of a color-shift dye, a photovoltaic material, a magnetic material, an electrochromic material, a thermochromic material, a magneto-optical material, a photorefractive material, a light scattering material, and a phase change material. Non-limiting examples of optical state change materials include halochromic optical state change materials, photo-bleachable materials, polymeric materials, organic compounds, hydrogels, liquid crystalline materials, leuco dyes, inorganic compounds such as, but not limited to, metal oxides and organometallic compounds, materials capable of undergoing a sigmatropic bond rearrangement, and reactive adduct materials. In various embodiments, the optical state change materials may undergo the optical state change under the influence of thermal stimulus for example, thermochromic or an electrical stimulus for example, electrochromic. The term "thermochromic" as used herein, describes materials that undergo either a reversible or an irreversible thermally induced color change. The term "electrochromic" as used herein, describes materials that undergo either a reversible or an irreversible electrically induced color change. One suitable halochromic optical state change material that may be used in the mark is a chromic dye. As described herein the term "halochromic" describes a material which changes optical state for example, color, upon a change in pH i.e., a change in the acidity or basicity results in a change in the optical absorbance of the chromic dye. This process is also known as "acidichromism" or "halochromism". For example, the mark may contain a dye i.e., a pH responsive dye such as for example a triaryl methylene dye. One example of a triaryl methylene dye is the sodium salt of Bromocresol green, which undergoes a change in its maximum optical absorbance from about 600 nm to about 650 nm at a pH value greater than about 7 to an optical absorbance below 450 nm at a pH values less than about 5. Within the scope of this disclosure the terms "pH" or "change in pH" are used to describe the acidity, basicity, or change in acidity or basicity of the mark. A decrease in the pH is a result of an increase in acidity (or decrease in basicity) and an increase in the pH is a result of a decrease in acidity (or increase in basicity). In aqueous systems, pH values less than 7 are classified as acidic and pH values greater than 7 are classified as basic.

Non-limiting examples of dyes that can be used include bromocresol green, bromocresol purple, bromothymol blue, bromophenol blue, thymolphthalein, thymol blue, aniline blue WS, durazol blue 4R, durazol blue 8G, magenta II, mauveine, naphthalene blue black, orcein, pontamine sky blue 5B, naphthol green B, picric acid, martius yellow, naphthol yellow S, alcian yellow, fast yellow, metanil yellow, azo-eosin, xylidine ponceau, orange G, ponceau 6R, chromotrope 2R, azophloxine, lissamine fast yellow, tartrazine, amido black 10B, bismarck brown Y, congo red, congo corinth, trypan blue, Evans blue, Sudan III, Sudan IV, oil red O, Sudan black B, Biebrich scarlet, Ponceau S, woodstain scarlet, Sirius red 4B, Sirius red F3B, fast red B, fast blue B, patent blue V, auramine O, malachite green, fast green FCF, light green SF yellowish, pararosanilin, rosanilin, new fuchsin, Hoffman's violet, methyl violet 2B, crystal violet, Victoria blue 4R, methyl green, ethyl green, ethyl violet, acid fuchsin, water blue I, methyl blue, chrome violet CG, chromoxane cyanin R, Victoria blue R, Victoria blue B, night blue, pyronin Y, pyronin B, rhodamine B, fluorescein, eosin Y ws, ethyl eosin, eosin B, phloxine B, erythrosin B, rose bengal, Gallein, acriflavine, acridine orange, primuline, thioflavine T, thioflavine S, safranin O, neutral red, azocarmine G, azocarmine B, safranin O, gallocyanin, gallamine blue, celestine blue B, nile blue A, thionin, azure C, azure A, azure B, methylene blue, methylene green, toluidine blue O, alizarin, alizarin red S, purpurin, anthracene blue SWR, alizarin cyanin BBS, nuclear fast red, alizarin blue, Luxol fast blue MBS, alcian blue 8GX, saffron, Brazilin and Brazilein, hematoxylin and hematein, laccaic acid, Kermes, and carmine. Non-limiting examples of photo-bleachable materials may include dye compounds selected from xanthenes, thiazines, oxazines, triarylmethines, lactones, cyanines, fulgides, spiropyrans, and diarylethenes. Examples of dye compounds can include, but are not limited to, methylene blue, toluidine blue, Rose Bengal, erythrosine B, eosin Y, and fluorone dyes.

In general, as mentioned, the mark if having an optical state-change material may be in one of a first optical state or a second optical state. In some instances, when the mark is in a first optical state the mark may be dark or un-bleached and when the mark is in the second optical state the mark may be transparent or bleached. When the optically detectable marks are in the first optical state they may function to render the disc unreadable at the location of the mark and when the optically detectable marks are in the second optical state they may function to render the disc readable at the location of the mark. The mark may render the optical article partially or completely unreadable in the pre-activated state of functionality of the optical article. In the pre-activated state, the mark may act as a read-inhibit layer by preventing the incident laser light of an optical data reader from reaching at least a portion of the optical data layer and reading the data on the optical data layer. For example, the mark may absorb a major portion of the incident laser light, thereby preventing it from reaching the optical data layer to read the data. This may prevent the player from executing a command and thereby alter the playback sequence (also known as navigation logic).

In certain instances, when the mark is in the first optical state the optical article may be considered to be in a pre-activated state of functionality i.e., the mark is non-bleached and when the mark is in the second optical state the optical article may be considered to be in an activated state of functionality, i.e., the mark is bleached. The difference in the percent optical reflectivity or the percent reflectivity of at least one portion of the optical data layer in the pre-activated state of functionality and the activated state of functionality may be at least about 10 percent. In some examples, the difference in the percent optical reflectivity or the percent reflectivity of at least one portion of the optical data layer in the pre-activated state of functionality and the activated state of functionality may be in a range from about 10 percent to about 15 percent, from about 15 percent to about 20 percent, or from about 20 percent to about 25 percent, or from about 25 percent to about 30 percent or from about 30 percent to about 40 percent. It should be appreciated that there are analogous predetermined values of optical properties for activating different optical articles. For example, the specified (as per ECMA-267) minimum optical reflectivity for DVD-9 (dual layer) media is in a range from about 18 percent to about 30 percent and is dependent upon the layer (0 or 1).

The optical article having the mark (with the optical state-change material) may be transformed from a pre-activated state of functionality to an activated state of functionality. Conversion from the pre-activated state of functionality to the activated state of functionality is achieved by the activation of the mark, which is deposited in or on the optical article, such that the mark allows optical communication with the optical data layer. As used herein, the term optical communication refers to transmission and reception of light by optical devices, such as CD players. Again, the mark may be activated by interacting with one or more stimuli, for example, an electrical stimulus, a thermal stimulus, or an optical stimulus applied to the mark. In one embodiment, the mark is capable of irreversibly altering the state of functionality of the optical article. In the pre-activated state, at least one portion of the data from the optical data layer is unreadable by the incident laser light of an optical data reader device, however, this same portion of data can be read from the optical data layer in the activated state of functionality.

The term "pre-activated" state of functionality generally refers to a state of functionality of the optical article where the mark has not yet been exposed to one or more external stimuli, while the "activated" state may refer to a state of functionality where the mark has been exposed to the external stimuli. In one embodiment, the "pre-activated" state comprises at least one mark which inhibits portions of the optical data layer that are located directly in the optical path of the incident laser light of an optical data reader from being read. The "activated" state comprises a state of the optical article where the optical data layer can be read by the optical data reader as a result of the article being exposed to the laser light of a player.

In various embodiments, the mark, whether or not containing an optical state-change material, may be deposited in a discrete area on the optical article, such that at least one mark, at least one line, at least one radial arc, at least one patch, a continuous layer, or a patterned layer extends across at least a portion of the optical article. One or more marks may be deposited on the optical article in various forms, such as a discrete portion, a continuous film, or a patterned film.

Alternatively, instead of being deposited on the surface of the optical article, the mark may be deposited inside the structure of the optical article. In optical storage articles, the mark may be deposited in the substrate on which the optical data layer is deposited. In such an embodiment with an optical state-change material, an ink composition used to deposit the mark may be mixed with the substrate material of the optical article. In alternate embodiments, the mark may be deposited between the layers of the optical article, or may be deposited within a layer of the optical article. For example, the ink composition may be incorporated in the UV curable adhesive of the bonding (spacer) layer. It should be appreciated that these marks should be sufficiently thermally stable to withstand the manufacturing temperatures of the optical article. Also, these marks may absorb the wavelength of the laser light in one of the activated, or the pre-activated state of the optical article. Upon being inserted into a player, the mark present inside the substrate may change color. As a result, the substrate may become transparent to the laser light, thereby facilitating the transmittance of laser light through the substrate in the future and making the optical article readable.

In another embodiment, the optically detectable marks comprise static marks. In one example, the static marks may be created on the surface of the optical article using heat distortion techniques known to one skilled in the art. For example, when a customized player-readable code is determined using a combination of the static marks and the control logic programmed on the article, instead of printing marks comprising a optical state change material and subjecting the marks to an activation signal to result in a state change, tags comprising heating elements may be attached the optical article. When the optical article is activated using point-of-sale (POS) equipment, the POS equipment may provide an electrical impulse to the tags, and the electrical impulse is converted to heat by a heating element. This heat results in distorting pre-determined data-containing regions on the DVD resulting in the formation of static marks on the DVD. In various other embodiments, the static marks may be made using an irreversible print method such as a solvent that permanently clouds the optical article, a powerful laser that marks the reflective layer of the disc, or a small heater that distorts the readout surface of the optical article. In one embodiment, the static marks are not reversible. In one embodiment, the optical article comprises a combination of a plurality of optically detectable marks comprising an optical state change material and static marks.

A portion of the content may be located on a data track, which is at least partially covered by the mark. The content may be placed on the same layer that may be in close physical proximity to the printed mark such that the mark that covers at least a portion of the control logic is activated i.e., bleached, by a portion of a defocused laser beam incident on the portion of the content and on a portion of the mark. Since the control logic and the content are contained in the same layer and the bleaching of the mark may be referred to as adjacent bleaching.

The optical article may include more than one layer such as for example a dual layer DVD-9 disc. In this case, the control logic may be located in a first layer, and a portion of the content may be located on a second layer and wherein a portion of the content is located directly under the first control logic and wherein at least portion of the control logic is covered by the mark. For example the control logic may be located on layer 0, and a portion of the content is located on a data track that may be physically located on layer 1 directly underneath the printed mark that covers the control logic. Since the content may be physically located in a layer placed underneath the layer containing the control logic, and is placed directly beneath the control logic the bleaching of the mark may be referred to as underneath bleaching. The bleaching of the mark may occur unnoticed by the viewer when the optical article is inserted in the optical article reader.

In yet another example, the control logic may be located on a second layer, and a portion of the content may be located on a first layer with a portion of the content located directly above the control logic and the control logic being covered by the mark. For example the control logic may be located on layer 1, and a portion of the content located on a data track that may be physically located on layer 0 directly above the printed mark that covers the control logic. They may be arranged such that a portion of the defocused laser beam at the surface of the optical article is incident a portion of the printed mark that covers the control logic while reading the portion of the content, in order to bleach the marks. Since the content may be physically located in a layer placed above the layer containing the control logic, and is placed directly above the control logic, the bleaching of the mark may be referred to as over-the-top bleaching. The control logic and portions of the content in an optical article may be so located that the optical article may be activated using a combination of the adjacent, underneath and over-the-top bleaching. This may help to increase the time that the laser beam is incident upon the mark.

In sum, the present technique generally relates to employment of a mark (e.g., printed spot), as well as a partial corruption of the data on an optical article (e.g., optical disc) during the mastering step to allow the media to respond to an external stimulus (other than the user). In this application, a mark or printed spot (e.g., physical mark, non-bleachable spot, or bleachable spot) may cover navigation data on an optical disc, and if optical state-change material (e.g., dye) is employed, depending on the state of the dye in the spot (bleached/not bleached) the navigation data may or may not be readable. The disc will behave differently depending on the state of the dye in the printed spot. In the case of a non-bleachable spot, the navigation data may never be read. As discussed, applications may include security, content customization, or limited play features, for example.

Again, however, due to the generally robust error correction mechanism in optical media, the mark typically should be quite large to provide for the navigation data to be unreadable in most or all players on the marketplace (i.e., from the outset or when in the unbleached state). In addition, due to generally low-printing precision in the art relative to the high precision of mastering of optical media, the spot may cover many more sectors than just the critical navigation sector desired. These factors may cause certain players to crash or pause for unacceptably long periods of time, for example, during playback of the printed disc. However, if data within an error correction code block associated with the sector having the navigation command is partially corrupted during the mastering step in the fabrication of the optical article, for example, the sector can be rendered unreadable by a relatively smaller printed spot. Thus, the sectors on data tracks surrounding the critical navigation sector may retain their full error correction capability and remain readable although they too are partially obscured by the printed spot.

III. Corruption of Error Correction—Pre-Mastered Errors

In accordance with the present technique, a combination of pre-mastered errors and permanent marks or printed spots can allow for substantially precise blocking of sectors on a disc, and reduce the potential of failure (i.e., crashing) of the disc with a larger permanent mark or with a mark in the unbleached state. As discussed below, an approach with the intentional corruption of the error correction code is to allow parity data to be calculated by encoder during the mastering step of the DVD, but then to change or delete columns and rows of user data. Advantageously, this creates parity mismatches. When the number of parity mismatches is too high, the player will not be able to correct the errors, and the sector will be fully corrupted, as desired, and the errors will be uncorrectable. Therefore, in certain examples with the permanent mark, the data desired to be obscured will not be properly read by the player. In security examples, this will cause commands to change data storage registers in the player to not be read, which enables the player to determine a code from the state of marks on the disc. In examples with the bleachable spot, the navigation command (or any data desired to be obscured) will not be read and instead the desired content or secondary content (e.g., limited-play content) will be read the first time the optical article is played. In this latter case, the navigation command will then become readable after the first play and changing of the optical state of the mark (e.g., after bleaching of the printed spot with the laser of the player during the first play).

The pre-mastered error(s) and printed spot(s) generally should obscure enough data together to provide that all players on the marketplace are not able to read the obscured data. However, with the bleachable spot, the pre-mastered errors and printed spot should allow enough data to be readable in the bleached state that the obscured data (e.g., navigation data) can be read by most or all players. Relevant factors that may be properly balanced to make the process work include the magnitude of pre-mastered error, the printed spot design, and the location of the printed spot relative to the physical location of the corrupted data on the disc, and so on.

Thus, in some examples, logical navigation commands on an optical disc may be obscured by a spot containing a dye that can change state to allow for a disc to respond to changes that are not input by the user. For instance, an application may use a bleachable dye. In certain cases, when the spot is dark (unbleached), the navigation data is not readable, and when the spot is bleached, the navigation data is readable. Without the present technique of incorporating intended corruption of error correction data (examples given below), a spot printed on the disc would have to be large to overcome the error correction. Moreover, most players on the marketplace behave differently both in response to an unreadable sector on the disc and time to respond to tracking problems during playback. While the optimum between spot size/design, error correction, and player tracking response may be found for a particular model of player, it is difficult, without employing other techniques, such as the present technique of corrupting the error correction code, to balance these factors to make the desired unbleached/bleached behavior universal for all players currently on the market.

In addition, as mentioned, for a relatively large printed spot, the spot may cover several other sectors of data due to the relatively low precision/accuracy in large scale industrial printing, for example. Thus, in addition to obscuring the sector of interest on the optical media, the large printed spot may also obscure many other sectors. For certain players and computer drives, a large number of affected sectors may cause catastrophic failure such as crashing of the disc in the player. However, if the error correction code of the sector with the logical command is partially corrupted during the mastering stage (i.e., pre-mastering errors), a much smaller print pattern is necessary to cause the target sector on the disc to become unreadable. Beneficially, the surrounding sectors, which do not have pre-mastered errors, remain readable even with the spot in the unbleached or dark state.

One application may include a limited release movie that is de-activated when the laser bleaches a photosensitive spot on the disc. Another may be a limited-play advertising that plays only once; after a photosensitive spot on the disc is bleached by the reading laser, the advertisement will not play again. Another example may include a spot for security on the disc that must be activated at the point of purchase, where the spot color may be affected by and external stimulus such as heat, light, electrical potential, etc. In this case, if a disc has not been activated the spot remains dark and the disc is unplayable.

Further, as discussed, the spot or mark may be non-bleachable and permanent from the outset. Applications may include mass-producing an optical article with a variety of data, optional data, and so on, and with portions of the data desirably permanently obscured. One example is to have digital content (e.g., movie) provided in several different languages on a DVD or CD, and to then to obscure navigation or access to particular undesired languages, depending on the geography of the sale, for example. In another example, DVD's may be mass-produced to contain numbers (e.g., lottery numbers), codes (e.g., for security or identification), data, and the like, and then particular numbers or codes are obscured on the particular DVD's with the printed spot or mark, depending on the intended recipient of the particular DVD.

While employing a mark or printed spot may function adequately in limited instances without pre-mastered errors in certain players, the media unfortunately will generally not behave universally on most or all optical media players on the marketplace. For example, some players, which are better at correcting tracking-borne failures, will be able to read the data unless the spot is very large. Moreover, several players (including most or all ROM or computer drives) will pause as the player attempts to read and correct all of the corrupted sectors on adjacent data tracks, which unfortunately may take several minutes if there are many corrupted sectors.

Advantageously, the incorporation of pre-mastered errors with printed spots can allow for a specific targeting of the critical navigation sector, will make the long pauses disappear, and will allow for more universal behavior on all manufactured players. The end result would be enhanced user experience, a much lower probability of consumer complaints, and additional advertising revenue generated because more players will be compatible with the new logic than if pre-mastered errors are not used. See section VI below for examples of configuration of the error correction code with pre-mastered errors.

IV. Error Correction

One type of media to which the present technique may be applied is a digital versatile disc, or DVD. The DVD production process generally involves compression and authoring of the media content (e.g., movie content) to a compressed data and logical structure. The compressed data and logical structure is then encoded (i.e., converted) to a DVD "language." The output of an encoder is to a laser beam recorder, or LBR, which cuts the data into a glass master that is eventually converted into a metal stamper used to make the DVDs. Thus the DVD language or content is subjected to encoding and mastering steps where the DVD content is ultimately converted to physical pits on a metal stamper. As appreciated by those skilled in the art, the content is mass produced by replicating the content from the metal stamper onto plastic via physical pits and lands implemented on the plastic.

Data on a DVD may be divided into discrete sub-units, called sectors. Each sector of user data, containing 2048 bytes, can be scrambled with a bit-shifting process to help spread the data around for error correction. Sixteen extra bytes are added to the beginning: 4 bytes for the sector ID, 2 bytes for ID error detection, and 6 bytes of copyright management information. Four bytes of payload error detection code are also added to the end. This makes a data sector of 2064 bytes, called a data unit 1. Each data sector is arranged into 12 rows of 172 bytes. 16 data sectors are stacked into error correction code (ECC) blocks —192 rows of 172 bytes. For each of the 172 bytes (or columns) of the ECC block, a 16-byte outer-parity Reed-Solomon code may be calculated, forming 16 new rows at the bottom. For each of the 208

(192+16) rows of the ECC block, a 10-byte inner-parity Reed-Solomon code may be calculated and appended. The rows of 16 data sectors are interleaved together (spreading them apart physically to help with burst errors)—the ECC block is then broken up into recording sectors by taking a group of 12 rows and adding 1 row of parity codes. This spreads the parity codes apart for further error resilience. In one example, the additional error detection and correction information takes up approximately 13% of the total data. When players read the data on a DVD, they may read the entire set of data and decode the data—if there are mismatches between the user data (the original data) and the parity data, the player can detect and automatically correct this.

Thus, in sum, for a DVD error correction scheme, there is original data contained within the sector of interest (e.g., sector 0). Inner parity data is calculated from the rows within this sector using a Reed-Solomon code, and is appended to the end of the rows. Outer parity data is calculated for each column using a Reed-Solomon code, and is appended to the bottom of each column to form 16 new rows. In addition, inner parity data is calculated from the outer parity rows, and the result (extra parity data) is appended to the end of the rows.

In this exemplary error correction code, upon calculation of the inner and outer parity data, the sectors are interleaved, which spreads the data from each sector to different physical locations, which will make the disc more robust to physical damage. In this example, the first row of sector 0 is placed first, the first row of sector 1 is placed below that, etc. The outer parity rows are also interleaved with the data rows. There are 16 outer parity rows to be interleaved with 16 sectors of 12 rows each. The outer parity sectors are inserted every 12th row in the final data sectors. Thus, they reside asymmetrically throughout the final ECC block with respect to the original 12-row data sectors.

V. Combining Pre-Mastered Errors with Marks

Again, if the error correction code of the sector with the logical command is partially corrupted during the mastering stage (i.e., pre-mastering errors), a much smaller print pattern may be employed to cause the target sector on the disc to become unreadable. In this case, the surrounding sectors (both on layer 0, and underneath the logic on layer 1 of a DVD9), which do not have pre-mastered errors, will remain readable even with a permanent spot, or with a spot in the unbleached or dark state. This generally reduces the problem of player universality; players vary greatly in their response to tracking-borne failures. With a small spot and pre-mastered errors, however, the players will not lose tracking and their behavior will be much more universal. It is believed that the response to small bits of unreadable data should be generally universal as outlined in the DVD specification.

In addition, incorporation of pre-mastered errors may lessen the problem of too many uncorrectable errors. Effectively, incorporation of pre-mastered errors (PME) may make only the sector of interest corrupt, while leaving adjacent and underlying data readable. This may also facilitate the "underneath bleaching" example as described above because all of the video content on layer 1 remains readable.

An approach is to allow parity data to be calculated by the encoder during the mastering step of the DVD, then to corrupt selected columns and rows of user data. Thus, the following scheme may be employed for pre-mastering errors. First, the encoder calculates the inner and outer parity data as normal. After the parity data are calculated, the original data within a small number of the original data rows (and columns) are changed or deleted (i.e., the data within the rows/columns are set to values of zero). This process is referred to as corrupting the specified rows and columns. This in effect creates parity mismatches. When the number of parity mismatches is too high, the player will not be able to resolve or correct the errors, and the sector will be fully corrupted.

In particular, the corruption levels may be specified as the number of rows and columns of the data sector that are corrupted in the error correction code (ECC) block. For example, a corruption level of "rows 0-10 corrupt rows 0-11" will indicate corruptions to the first 11 columns or bytes in all 12 rows of the target sector. In certain cases it is necessary to corrupt data that resides in a completely different sector than the target sector in order to corrupt the target sector.

VI. Examples of Combining Marks with Corruption of Error Correction

The following examples are set forth to provide those of ordinary skill in the art with a detailed description of how the techniques claimed herein are evaluated, and are not intended to limit the scope of what the inventors regard as their invention.

In the examples discussed below, three DVD test discs were created with various levels of pre-mastered errors on certain sectors. The sectors contained video data. The pre-mastered error level was specified as the number of columns and number of rows to be corrupted in the ECC (error correction code) block. In the testing, 42 levels of pre-mastered errors were built into the three DVDs. The three DVDs were mastered and discs replicated.

Spots were drawn on the disc using an extra fine-point felt-tip marker. The spots were drawn in the pattern approximately 0.5 mm×0.5 mm in size and spaced in a radial arc with a separation of 0.5 mm. Four separate sets of spots were drawn at the angle and radius to obscure the data in four of the partially corrupted sectors. The spots were drawn at an angle to follow the spiral of the DVD data.

The discs were examined in a DVD-ROM drive with a data archiving program, Isobuster, which allows for sectors to be probed to determine if the sector is readable. Results were obtained for a 10-spot pattern near a sector with columns 0-10 and rows 0-12 corrupted. In this example, the spot pattern causes sectors with pre-mastered errors to become unreadable by the player. However, the spot pattern was large enough that it causes sectors without pre-mastered errors to become unreadable as well. It should be noted that the DVD data track is only 0.7 microns wide, and the printed spot is 500 microns, and thus approximately 700 tracks are covered by the printed spot. This pattern causes unreadable data over an area of approximately 30,000 sectors. This disc was put into a DVD player (Magnavox MWD7006) and the video playback was observed. When the read laser hit the printed area, the player froze up, presumably due to the large number of sectors which are unreadable. This disc also freezes up when playback is attempted in a computer drive, Lite-on SHOW-1693S.

To contrast this behavior, a smaller pattern was drawn on another test disc with the same levels of pre-mastered errors. The smaller pattern was a 3-spot pattern with the spots 0.5 mm×0.5 mm in size and spaced in a radial arc with a separation of 0.5 mm. Four separate sets of spots were drawn at the angle and radius to obscure the data in four of the partially corrupted sectors. The spots were drawn at an angle to follow the spiral of the DVD data. The 3-spot pattern was printed with the spot starting at precisely the same location as the 10-spot pattern described above. In this case, there were no sectors found to contain uncorrectable errors.

In a third example, the print angle of the 3-spot pattern was shifted to be approximately 30 degrees downstream of the 2 print patterns discussed previously. In this case uncorrectable errors were generated, but only in the sector that contained pre-mastered errors. What is notable about this print is that only the target sectors are rendered unreadable by the spot pattern, while the rest of the sectors remain fully correctable. This is due to the combination of the spot pattern and the level of errors pre-mastered into the disc (in this case columns 0-10 and rows 0-12 were corrupted during the mastering step). This is a remarkable improvement in that only two sectors rather than several thousand are rendered unreadable. This disc was put into a DVD player (Magnavox MWD7006) and the video playback was observed; when the player hit the printed area, the player only paused for a very short time on the order of one half second. When playback is attempted in a computer drive, Lite-on SHOW-1693S, the player paused for approximately 30 seconds and continued playback. Clearly, the pausing behavior is improved by pre-mastering errors and using a smaller spot pattern to precisely obscure a targeted sector.

Out of the 42 levels of pre-mastered errors provided, 6 levels were tested in detail. The results on varying the error level are given in the following list:

1) Columns 0-12 and rows 0-16 corrupted: sectors are not correctable, even when no printed spot is present
2) Columns 0-10 and rows 0-16 corrupted: sectors are not correctable, even when no printed spot is present
3) Columns 0-10 and rows 0-12 corrupted: When no spot is printed, sectors are readable. This test is described above. With a 10-spot pattern, many sectors are uncorrectable, even sectors without pre-mastered errors. With a 3-spot pattern at 30 deg offset, only the sectors with pre-mastered errors are rendered uncorrectable.
4) Columns 0-6 row and 0-12 corrupted: When no spot is printed, sectors are correctable. With a 10-spot pattern, many sectors are uncorrectable, even sectors without pre-mastered errors. With a 3-spot pattern at 30 deg offset, only the sectors with pre-mastered errors are rendered unreadable.
5) Columns 0-10 row and 0-5 corrupted: All sectors are readable, both with no printed spots and with a 3-spot pattern with 30 degree offset.
6) Columns 0-8 row and 0-5 corrupted: All sectors are readable, both with no printed spots and with a 3-spot pattern with 30 degree offset.

The examples described above indicate that with the correct magnitude of pre-mastered error, the printed spot design, and the location of the printed spot relative to the physical location of the corrupted sector on the disc, a specific sector may be rendered unreadable with a printed spot while leaving the rest of the sectors on the disc readable. This leads to improved performance, such as reduced pause time during playback and less tendency of the disc to crash.

While the discs with premastered errors on video content discussed in the previous section were useful as a check, it required the use of a computer and specialized software to determine if a sector was uncorrectable. Thus, the sectors could not be reliably tested on various set-top DVD players to make this determination. A series of test discs was authored with Forced Activation commands (FOAC) to order the players to change the value of a GPRM register. The FOAC command was authored with a single critical sector; if the critical sector is readable, the GPRM value will be changed and the player will be directed to display a screen that indicates that the target sector was properly read by the player. If the critical sector is not readable, the value of the register will not be changed, and the player will be directed to display a still that indicates that the target sector was not read. Thus the discs could be tested on a variety of players and the error levels at which the players cannot correct the errors can be determined. Several test elements were created on each disc; and the critical sector for each element was mastered with a different partial error level.

Results of this testing are presented graphically in FIGS. 4-7, which depict graphs 70, 72, 74, and 76. The axis 78 corresponds to the number of rows that may be corrupted in the data sectors of the ECC block, starting with row 0. Each sector in the ECC block has 12 data rows and thus there are 12×16=192 possible rows for corruption. The axis 80 corresponds to the number of bytes or columns that may be corrupted in the data sectors of the ECC block, out of a possible number of 172. Boxes with a sloping down crosshatch (as indicated by reference numeral 82 in the legend) represent that the sector with that level of errors (in column/row format) is correctable. Boxes with a sloping upward crosshatch (as indicated by reference numeral 84 in the legend) represent that the error level is not correctable.

Figure 4:
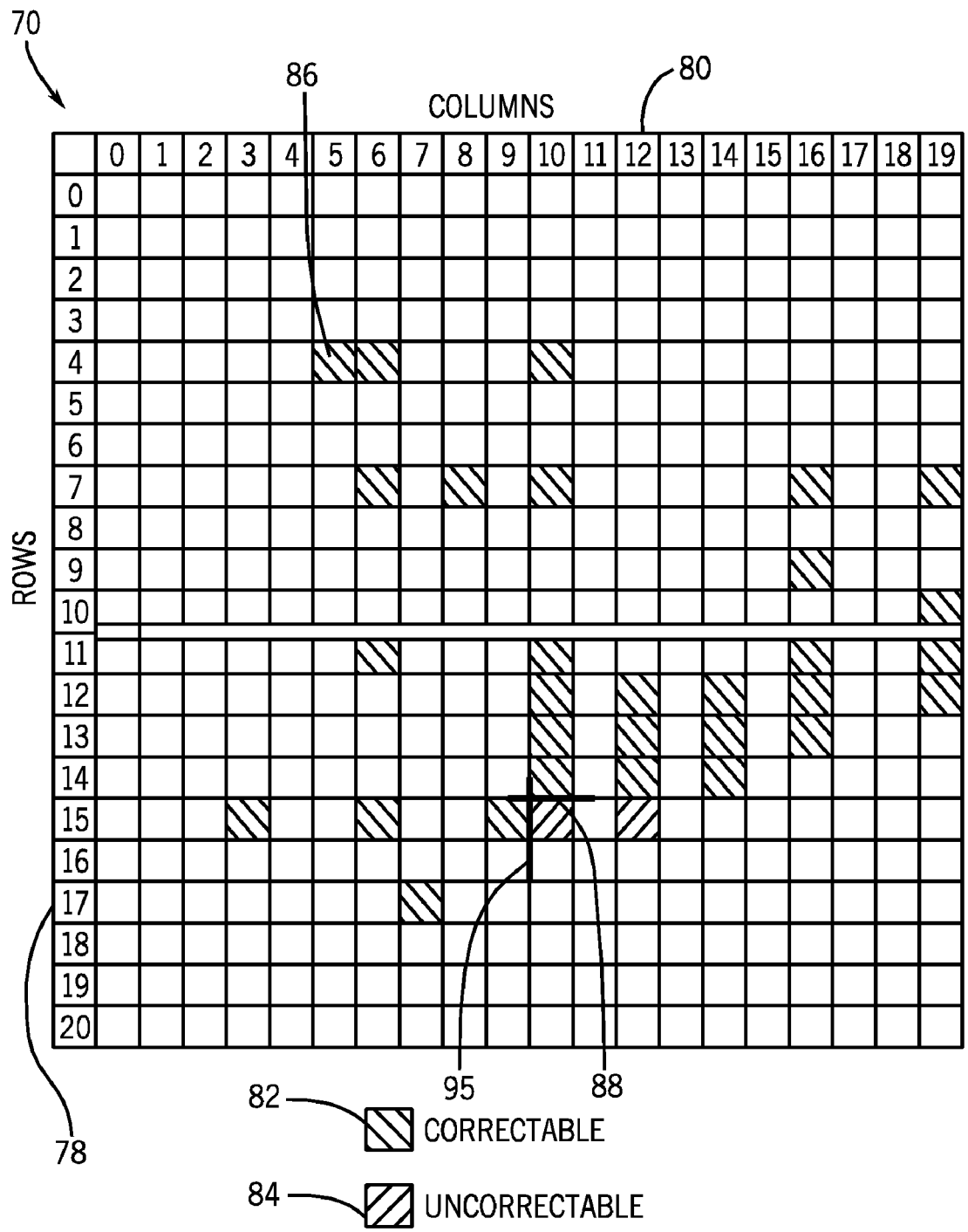

In these examples of FIGS. 4-7, the lowest corruption level evaluated involved erasing or changing data columns (or bytes) 0-5 from rows 0-5 within the ECC block. This point is shown in the upper leftmost point of FIGS. 4-7, as indicated by reference numeral 86. This level of corruption is correctable in these examples. The discs were tested in a variety of settop DVD players. The majority of players behaved as in FIG. 4. However, different behavior was observed for certain players. In FIGS. 4-7, transition points are observed from correctable to uncorrectable by either holding the number of corrupt columns fixed and adding corrupt rows (i.e. traversing down in the figure) (e.g., 88, 90, 92, and 94, respectively), or by holding the number of corrupt rows fixed and adding corrupt columns (i.e., traversing left to right in the figure) (e.g., 95, 96, 97, and 98, respectively). When one corrupts columns 0-10, a sector in the ECC block becomes uncorrectable when one corrupts rows 0-16, as shown by the leftmost uncorrectable square in FIG. 4. "Backing off" by one column (moving to the left in the FIG. 4 and traversing the boundary 95) or "backing off" by one row (moving up in FIG. 4 and traversing the boundary 88) results in a correctable sector. In this way the error level thresholds were mapped for various players. FIG. 4 presents the behavior observed on the majority of players tested. Players that follow this behavior of FIG. 4 were Magnavox MWD7006, Sony DVPNS55P, Pioneer DVD270, Phillips DVP3040, RCA DRC200N, JVC XVS300, Cyberhome CH-DVD300, Durabrand Dual-7C, Apex AD 1500, AMW (Amphion Media Works), Philips DCP750, Sony DVPNS425P, Xbox, Xbox360, Koss KS4125, Samsung DVD-V6700, and Philips DVP5140.

As mentioned, a few players in the testing bank were found to have behavior slightly different than that pictured in FIG. 4. In particular, Sony DVPNS315, Sony Playstation 2 Slim (circa 2006), Sony Playstation 2 Standard (circa 2002), and Sony Playstation 3 (40 GB) had correctable to uncorrectable transitions that occurred at slightly lower error levels (e.g., point 90) indicated in FIG. 5 than that seen in FIG. 4. In short, these players require an additional 2 rows that are not corrupted for the sectors to be readable. A small number of players show minor deviations, shown in FIGS. 6 and 7. These players (Toshiba SD3990 and Samsung HD860 for FIG. 6, and Panasonic DVD-RV32 for FIG. 7) show uncorrectable errors with fewer column corruptions (in the lower left part of the test space).

The data in FIGS. 4-7 demonstrate how a sector of data can be corrupted on a DVD ECC block. First, it should be noted that although the data for sector 0 is completely contained within data rows 0-11, errors had to be placed in the next sector (sector 1) to corrupt sector 0. This is because of outer parity error correction. In these examples, the ECC block uses a Reed-Solomon code to calculate the outer parity rows. Thus, even if the data in columns 0-11 is completely deleted, the outer parity correction, combined with the outer parity rows calculated from the inner parity data, can generally recover the data. However, when the first 5 rows of the second sector are also corrupted, this takes the corruption beyond the point of the parity correction.

Test elements (not pictured in FIGS. 4-7) containing corruptions limited to the data in sector 0 were also performed. Test elements with ECC blocks containing corruptions of columns 0-171 and rows 0-8, 75% of the data in the sector, were found to remain correctable. Clearly, the corruption schemes shown in FIG. 4 are generally more efficient and represent a low amount of data deletion to corrupt a sector in a DVD ECC block: corrupting columns 0-10 and rows 0-16 only represents 187 out of 2064 bytes, or 9%. The difference in the amount of data that is corrupted shows the power of outer parity correction on the DVD ECC scheme. The corruption efficiency may become important in the case where the data is corrected as the corresponding spot on the surface of the disc is bleached. Generally, it is beneficial to reduce the amount of corruption to make a sector uncorrectable.

Analysis of FIGS. 4-7 reveals a beneficial corruption scheme to combine with an irreversible mark or with a bleachable printed spot to create a reversibly corruptible sector. First, in FIG. 4, a transition point 88 occurs at a corruption level of columns 0-10 in between the corruption of the first 16 rows of the ECC block (rows 0-15) and corruption of the first 17 rows of the ECC block (rows 0-16). Thus, for corruption columns 0-10 and rows 0-15 of the ECC block, the data that to cover with a printed spot would be columns 0-10 of row 16. The data under the spot would be unreadable, and the sector would be corrupted. If the spot were bleached the data would be readable, and the sector would be correctable. In this case, a relatively small strip of data of 10 bytes would be covered, which would cover a physical dimension of only 24 microns long×0.7 microns wide in the data track of the disc. This represents a small "spot size" in physical space that could be printed to permanently or reversibly corrupt a sector on a DVD ECC block.

In a different approach, to cross the correctable-corrupt transition by taking the lowest corrupted columns 0-10, rows 0-16 scheme, and subtracting off one column to give columns 0-9 and rows 0-16 corrupted, and subsequently print over the non-corrupted columns. Indeed, this approach would ultimately result in an uncorrectable sector. A potential problem with this scheme is that the rows of the ECC block are interleaved to occupy different physical dimensions, and in this case the data to be covered by the spot may not exist in one continuous line. Instead of printing one continuous line that is 24 microns long, in this example, 10 lines that are 2.4 microns long would be printed in the exact place to cover the appropriate pieces of data to corrupt the sector. Unfortunately, the ECC data would be spread over approximately 90,000 microns of linear distance, and thus printing in this manner would be very difficult. Thus, the methodology described in the previous paragraph (row deletion) is generally superior in these examples to the deletion of columns for generating reversibly corruptible sectors with bleachable spots.

Figure 5:
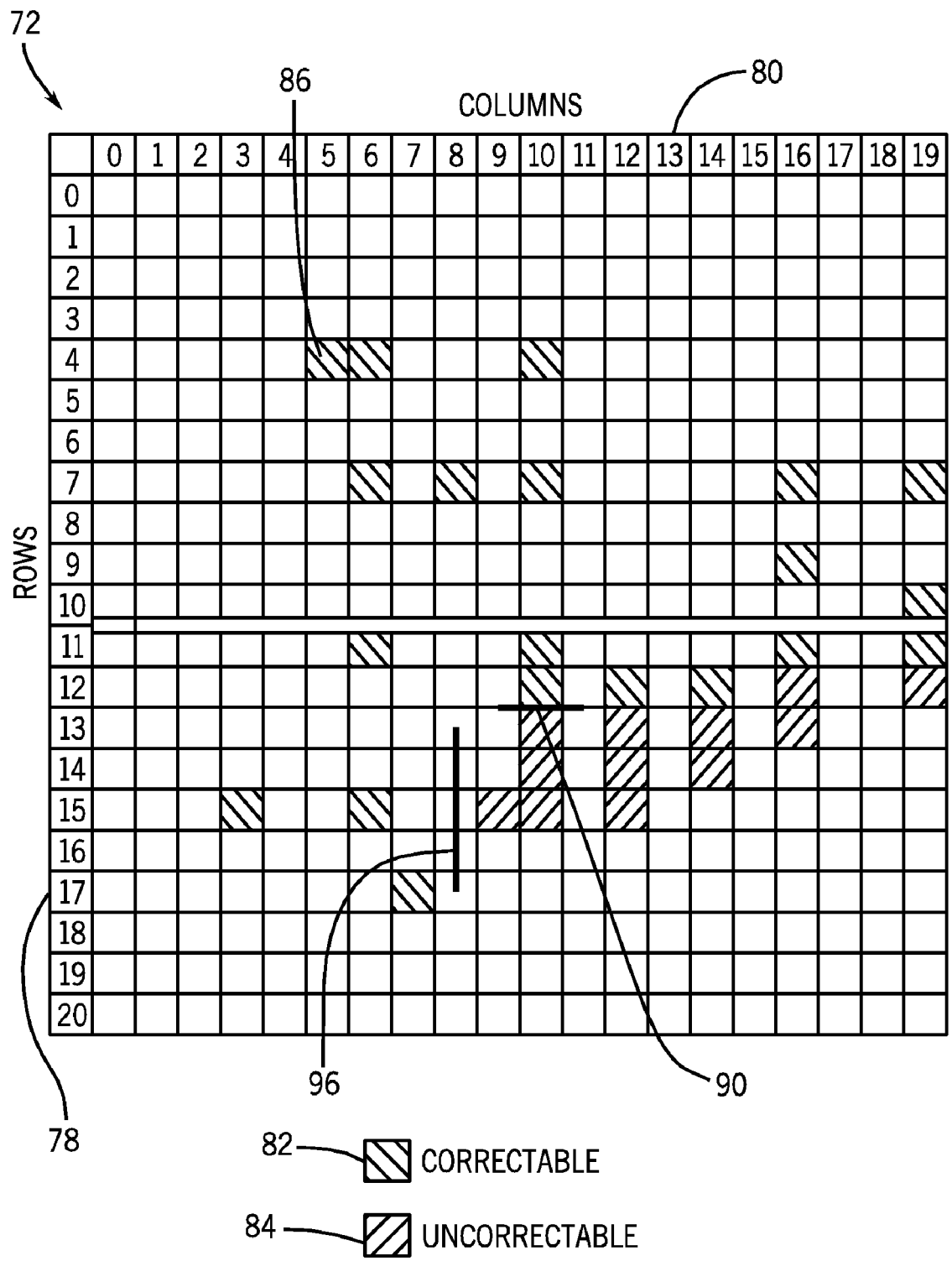
Figure 6:
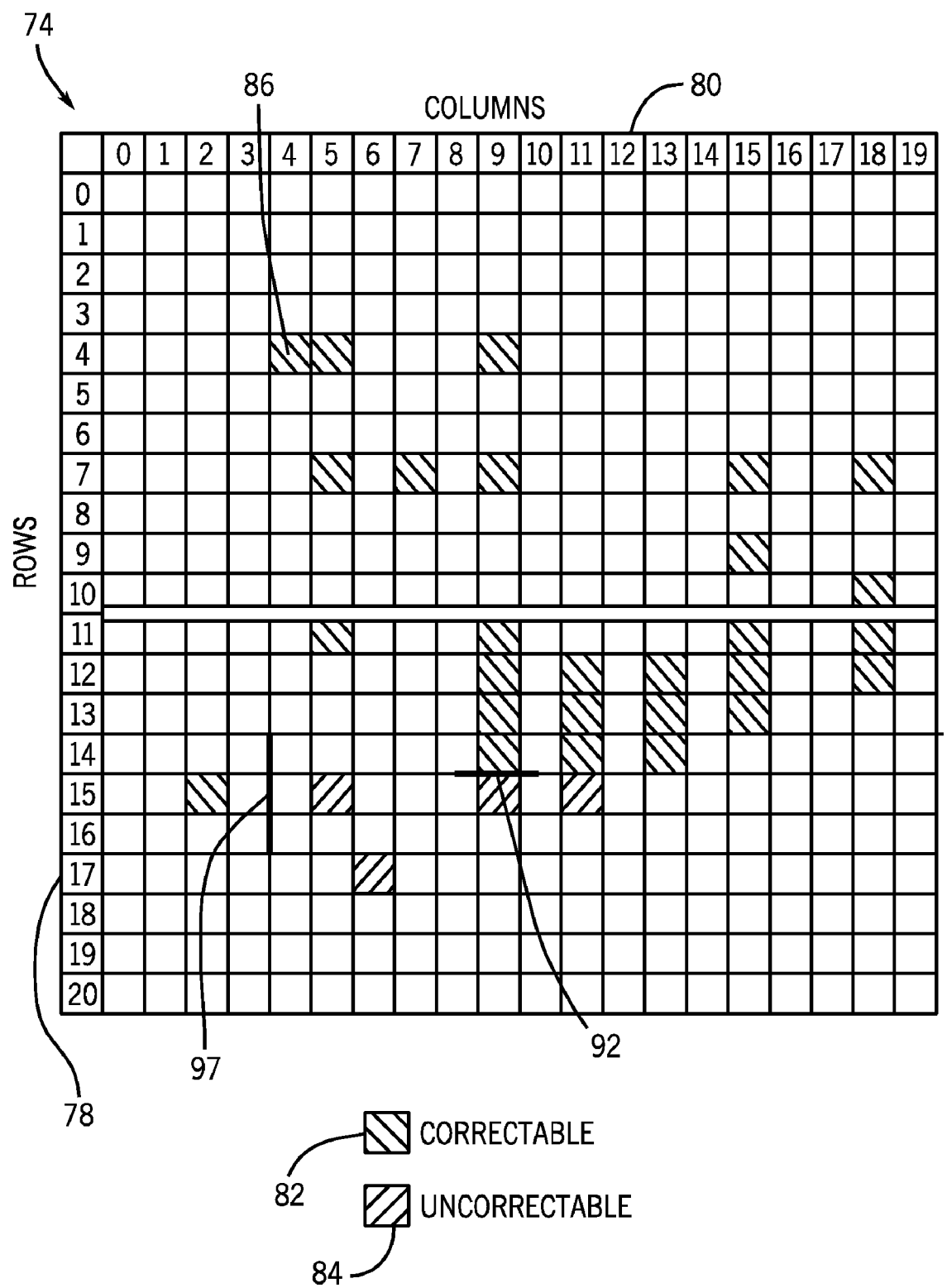
Figure 7:
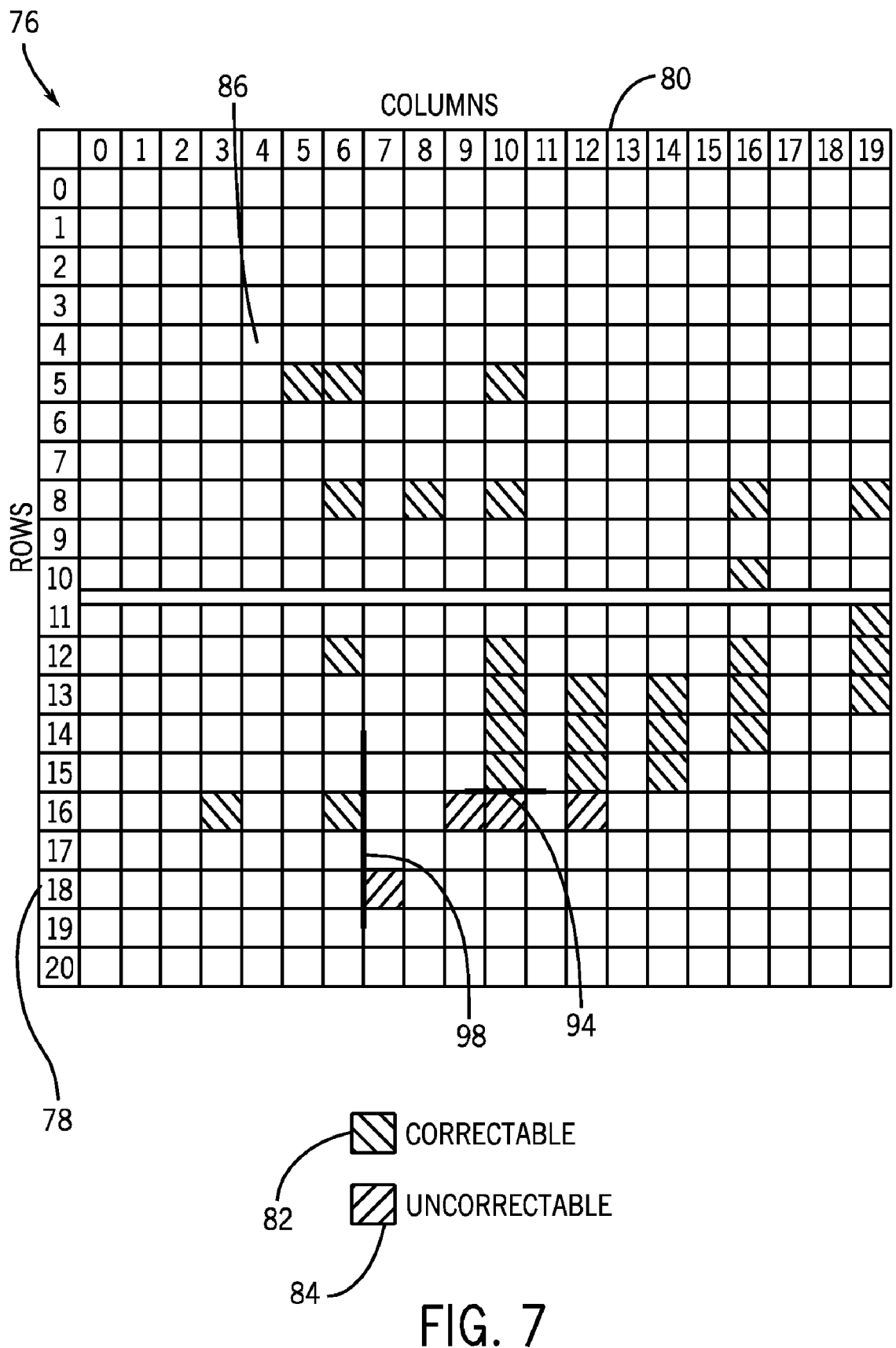

Returning to the "row deletion" scheme discussed, there may be some practical limitations to the spot size, as printed. Indeed, if one subtracts a single row from the lowest corrupted sector, the data track to be covered may be only 24 microns long×0.7 microns wide. However, the spot may not be printed on the data track but rather at the disc surface and should cover the beam that is de-focused on the surface of the disc. Thus, the spot should generally be wider than 0.7 microns. In certain examples, the beam is matched with spot 0.5 mm wide (500 microns wide). The spot length (length being azimuthal distance down the spiral of the DVD track) may only be 24 microns wide, but in practical terms, it may be difficult to reliably print with that accuracy. Thus, the spot length is typically also wider. The non-uniform behavior of the DVD players also causes a few problems with this scheme. Notably, as shown in FIG. 5, if starting with the lowest uncorrectable corruption level of 0-10 columns and 0-16 rows, and correcting (or "uncorrupting") the data in one of the rows, there are certain players that will remain unable to correct the data sector. Thus, starting at 0-10 columns and 0-16 rows, and "uncorrupting" 3 rows is beneficial in this example for a DVD with a bleached spot to be generally universally correctable throughout all typical DVD players on the marketplace. As discussed below, this may create challenges for creating a spot/pre-mastered error combination that is small in size.

In considering how the data in a DVD is placed physically, and if positioning on a data track and traversing the "spiral" of the DVD, the point of view of the data track would appear to be linear. If one starts at the beginning of the ECC block, the linear distance from the start to the piece of data of interest (sector, data byte, row, parity byte, etc) can be calculated. In this manner, with DVD ECC block, the data of interest may be mapped physically.

TABLE 1

Physical Layout of Rows of ECC Block, with approximate location of data row from start of ECC block.

| DATA Row | mm start | mm end | SECTOR | BYTES/TYPE | |
|---|---|---|---|---|---|
| 0 | 0 | 0.4145 | sector 0 | 172 | data |
| 0 | 0.4145 | 0.4386 | | 10 | inner parity |
| 0 | 0.4386 | 0.853 | sector 1 | 172 | data |
| 0 | 0.853 | 0.8771 | | 10 | inner parity |
| 0 | 0.8771 | 1.2916 | sector 2 | 172 | data |
| 0 | 1.2916 | 1.3157 | | 10 | inner parity |
| 0 | 1.3157 | 1.7302 | sector 3 | 172 | data |
| 0 | 1.7302 | 1.7543 | | 10 | inner parity |
| 0 | 1.7543 | 2.1688 | sector 4 | 172 | data |
| 0 | 2.1688 | 2.1928 | | 10 | inner parity |
| 0 | 2.1928 | 2.6073 | sector 5 | 172 | data |
| 0 | 2.6073 | 2.6314 | | 10 | inner parity |
| 0 | 2.6314 | 3.0459 | sector 6 | 172 | data |
| 0 | 3.0459 | 3.07 | | 10 | inner parity |
| 0 | 3.07 | 3.4845 | sector 7 | 172 | data |
| 0 | 3.4845 | 3.5086 | | 10 | inner parity |
| 0 | 3.5086 | 3.923 | sector 8 | 172 | data |
| 0 | 3.923 | 3.9471 | | 10 | inner parity |
| 0 | 3.9471 | 4.3616 | sector 9 | 172 | data |
| 0 | 4.3616 | 4.3857 | | 10 | inner parity |
| 0 | 4.3857 | 4.8002 | sector 10 | 172 | data |
| 0 | 4.8002 | 4.8243 | | 10 | inner parity |
| 0 | 4.8243 | 5.2387 | sector 11 | 172 | data |
| 0 | 5.2387 | 5.2628 | | 10 | inner parity |
| 0 | 5.2628 | 5.6773 | outer parity | 172 | data |
| 0 | 5.6773 | 5.7014 | | 10 | inner parity |
| 0 | 5.7014 | 6.1159 | sector 12 | 172 | data |
| 0 | 6.1159 | 6.14 | | 10 | inner parity |
| 0 | 6.14 | 6.5545 | sector 13 | 172 | data |
| 0 | 6.5545 | 6.5785 | | 10 | inner parity |
| 0 | 6.5785 | 6.993 | sector 14 | 172 | data |
| 0 | 6.993 | 7.0171 | | 10 | inner parity |
| 0 | 7.0171 | 7.4316 | sector 15 | 172 | data |
| 0 | 7.4316 | 7.4557 | | 10 | inner parity |
| 1 | 7.4557 | 7.8702 | sector 0 | 172 | data |
| 1 | 7.8702 | 7.8943 | | 10 | inner parity |
| 1 | 7.8943 | 8.3087 | sector 1 | 172 | data |
| 1 | 8.3087 | 8.3328 | | 10 | inner parity |

TABLE 1-continued

Physical Layout of Rows of ECC Block, with approximate location of data row from start of ECC block.

| DATA Row | mm start | mm end | SECTOR | BYTES/TYPE | |
|---|---|---|---|---|---|
| 1 | 8.3328 | 8.7473 | sector 2 | 172 | data |
| 1 | 8.7473 | 8.7714 | | 10 | inner parity |
| 1 | 8.7714 | 9.1859 | sector 3 | 172 | data |
| 1 | 9.1859 | 9.21 | | 10 | inner parity |
| 1 | 9.21 | 9.6244 | sector 4 | 172 | data |
| 1 | 9.6244 | 9.6485 | | 10 | inner parity |
| 1 | 9.6485 | 10.063 | sector 5 | 172 | data |
| 1 | 10.063 | 10.087 | | 10 | inner parity |
| 1 | 10.087 | 10.502 | sector 6 | 172 | data |
| 1 | 10.502 | 10.526 | | 10 | inner parity |
| 1 | 10.526 | 10.94 | sector 7 | 172 | data |
| 1 | 10.94 | 10.964 | | 10 | inner parity |
| 1 | 10.964 | 11.379 | outer parity | 172 | data |
| 1 | 11.379 | 11.403 | | 10 | inner parity |
| 1 | 11.403 | 11.817 | sector 8 | 172 | data |
| 1 | 11.817 | 11.841 | | 10 | inner parity |
| 1 | 11.841 | 12.256 | sector 9 | 172 | data |
| 1 | 12.256 | 12.28 | | 10 | inner parity |
| 1 | 12.28 | 12.694 | sector 10 | 172 | data |
| 1 | 12.694 | 12.719 | | 10 | inner parity |
| 1 | 12.719 | 13.133 | sector 11 | 172 | data |
| 1 | 13.133 | 13.157 | | 10 | inner parity |
| 1 | 13.157 | 13.572 | sector 12 | 172 | data |
| 1 | 13.572 | 13.596 | | 10 | inner parity |
| 1 | 13.596 | 14.01 | sector 13 | 172 | data |
| 1 | 14.01 | 14.034 | | 10 | inner parity |
| 1 | 14.034 | 14.449 | sector 14 | 172 | data |
| 1 | 14.449 | 14.473 | | 10 | inner parity |
| 1 | 14.473 | 14.887 | sector 15 | 172 | data |
| 1 | 14.887 | 14.911 | | 10 | inner parity |
| 2 | 14.911 | 15.326 | sector 0 | 172 | data |
| 2 | 15.326 | 15.35 | | 10 | inner parity |
| 2 | 15.35 | 15.764 | sector 1 | 172 | data |
| 2 | 15.764 | 15.789 | | 10 | inner parity |
| 2 | 15.789 | 16.203 | sector 2 | 172 | data |
| 2 | 16.203 | 16.227 | | 10 | inner parity |
| 2 | 16.227 | 16.642 | sector 3 | 172 | data |
| 2 | 16.642 | 16.666 | | 10 | inner parity |
| 2 | 16.666 | 17.08 | outer parity | 172 | data |
| 2 | 17.08 | 17.104 | | 10 | inner parity |
| 2 | 17.104 | 17.519 | sector 4 | 172 | data |
| 2 | 17.519 | 17.543 | | 10 | inner parity |
| 2 | 17.543 | 17.957 | sector 5 | 172 | data |
| 2 | 17.957 | 17.981 | | 10 | inner parity |
| 2 | 17.981 | 18.396 | sector 6 | 172 | data |
| 2 | 18.396 | 18.42 | | 10 | inner parity |
| 2 | 18.42 | 18.834 | sector 7 | 172 | data |
| 2 | 18.834 | 18.859 | | 10 | inner parity |
| 2 | 18.859 | 19.273 | sector 8 | 172 | data |
| 2 | 19.273 | 19.297 | | 10 | inner parity |
| 2 | 19.297 | 19.712 | sector 9 | 172 | data |
| 2 | 19.712 | 19.736 | | 10 | inner parity |
| 2 | 19.736 | 20.15 | sector 10 | 172 | data |
| 2 | 20.15 | 20.174 | | 10 | inner parity |
| 2 | 20.174 | 20.589 | sector 11 | 172 | data |
| 2 | 20.589 | 20.613 | | 10 | inner parity |
| 2 | 20.613 | 21.027 | sector 12 | 172 | data |
| 2 | 21.027 | 21.051 | | 10 | inner parity |
| 2 | 21.051 | 21.466 | sector 13 | 172 | data |
| 2 | 21.466 | 21.49 | | 10 | inner parity |
| 2 | 21.49 | 21.904 | sector 14 | 172 | data |
| 2 | 21.904 | 21.928 | | 10 | inner parity |
| 2 | 21.928 | 22.343 | sector 15 | 172 | data |
| 2 | 22.343 | 22.367 | | 10 | inner parity |
| 3 | 22.367 | 22.782 | outer parity | 172 | data |
| 3 | 22.782 | 22.806 | | 10 | inner parity |
| 3 | 22.806 | 23.22 | sector 0 | 172 | data |
| 3 | 23.22 | 23.244 | | 10 | inner parity |
| 3 | 23.244 | 23.659 | sector 1 | 172 | data |
| 3 | 23.659 | 23.683 | | 10 | inner parity |
| 3 | 23.683 | 24.097 | sector 2 | 172 | data |
| 3 | 24.097 | 24.121 | | 10 | inner parity |
| 3 | 24.121 | 24.536 | sector 3 | 172 | data |
| 3 | 24.536 | 24.56 | | 10 | inner parity |
| 3 | 24.56 | 24.974 | sector 4 | 172 | data |
| 3 | 24.974 | 24.998 | | 10 | inner parity |
| 3 | 24.998 | 25.413 | sector 5 | 172 | data |
| 3 | 25.413 | 25.437 | | 10 | inner parity |
| 3 | 25.437 | 25.852 | sector 6 | 172 | data |
| 3 | 25.852 | 25.876 | | 10 | inner parity |
| 3 | 25.876 | 26.29 | sector 7 | 172 | data |
| 3 | 26.29 | 26.314 | | 10 | inner parity |
| 3 | 26.314 | 26.729 | sector 8 | 172 | data |
| 3 | 26.729 | 26.753 | | 10 | inner parity |
| 3 | 26.753 | 27.167 | sector 9 | 172 | data |
| 3 | 27.167 | 27.191 | | 10 | inner parity |
| 3 | 27.191 | 27.606 | sector 10 | 172 | data |
| 3 | 27.606 | 27.63 | | 10 | inner parity |
| 3 | 27.63 | 28.044 | sector 11 | 172 | data |
| 3 | 28.044 | 28.068 | | 10 | inner parity |
| 4 | 28.068 | 28.483 | outer parity | 172 | data |
| 4 | 28.483 | 28.507 | | 10 | inner parity |
| 3 | 28.507 | 28.922 | sector 12 | 172 | data |
| 3 | 28.922 | 28.946 | | 10 | inner parity |
| 3 | 28.946 | 29.36 | sector 13 | 172 | data |
| 3 | 29.36 | 29.384 | | 10 | inner parity |
| 3 | 29.384 | 29.799 | sector 14 | 172 | data |
| 3 | 29.799 | 29.823 | | 10 | inner parity |
| 3 | 29.823 | 30.237 | sector 15 | 172 | data |
| 3 | 30.237 | 30.261 | | 10 | inner parity |
| 4 | 30.261 | 30.676 | sector 0 | 172 | data |
| 4 | 30.676 | 30.7 | | 10 | inner parity |
| 4 | 30.7 | 31.114 | sector 1 | 172 | data |
| 4 | 31.114 | 31.138 | | 10 | inner parity |
| 4 | 31.138 | 31.553 | sector 2 | 172 | data |
| 4 | 31.553 | 31.577 | | 10 | inner parity |
| 4 | 31.577 | 31.992 | sector 3 | 172 | data |
| 4 | 31.992 | 32.016 | | 10 | inner parity |
| 4 | 32.016 | 32.43 | sector 4 | 172 | data |
| 4 | 32.43 | 32.454 | | 10 | inner parity |
| 4 | 32.454 | 32.869 | sector 5 | 172 | data |
| 4 | 32.869 | 32.893 | | 10 | inner parity |
| 4 | 32.893 | 33.307 | sector 6 | 172 | data |
| 4 | 33.307 | 33.331 | | 10 | inner parity |
| 4 | 33.331 | 33.746 | sector 7 | 172 | data |
| 4 | 33.746 | 33.77 | | 10 | inner parity |
| 5 | 33.717 | 34.184 | outer parity | 172 | data |
| 5 | 34.184 | 34.208 | | 10 | inner parity |
| 4 | 34.208 | 34.623 | sector 8 | 172 | data |
| 4 | 34.623 | 34.647 | | 10 | inner parity |
| 4 | 34.647 | 35.061 | sector 9 | 172 | data |
| 4 | 35.061 | 35.086 | | 10 | inner parity |
| 4 | 35.086 | 35.5 | sector 10 | 172 | data |
| 4 | 35.5 | 35.524 | | 10 | inner parity |
| 4 | 35.524 | 35.939 | sector 11 | 172 | data |
| 4 | 35.939 | 35.963 | | 10 | inner parity |
| 4 | 35.963 | 36.377 | sector 12 | 172 | data |
| 4 | 36.377 | 36.401 | | 10 | inner parity |
| 4 | 36.401 | 36.816 | sector 13 | 172 | data |
| 4 | 36.816 | 36.84 | | 10 | inner parity |
| 4 | 36.84 | 37.254 | sector 14 | 172 | data |
| 4 | 37.254 | 37.278 | | 10 | inner parity |
| 4 | 37.278 | 37.693 | sector 15 | 172 | data |
| 4 | 37.693 | 37.717 | | 10 | inner parity |
| 5 | 37.717 | 38.131 | sector 0 | 172 | data |
| 5 | 38.131 | 38.156 | | 10 | inner parity |
| 5 | 38.156 | 38.57 | sector 1 | 172 | data |
| 5 | 38.57 | 38.594 | | 10 | inner parity |
| 5 | 38.594 | 39.009 | sector 2 | 172 | data |
| 5 | 39.009 | 39.033 | | 10 | inner parity |
| 5 | 39.033 | 39.447 | sector 3 | 172 | data |
| 5 | 39.447 | 39.471 | | 10 | inner parity |
| 6 | 39.471 | 39.886 | outer parity | 172 | data |
| 6 | 39.886 | 39.91 | | 10 | inner parity |
| 5 | 39.91 | 40.324 | sector 4 | 172 | data |
| 5 | 40.324 | 40.348 | | 10 | inner parity |
| 5 | 40.348 | 40.763 | sector 5 | 172 | data |
| 5 | 40.763 | 40.787 | | 10 | inner parity |

TABLE 1-continued

Physical Layout of Rows of ECC Block, with approximate location of data row from start of ECC block.

| DATA Row | mm start | mm end | SECTOR | BYTES/TYPE | |
|---|---|---|---|---|---|
| 5 | 40.787 | 41.201 | sector 6 | 172 | data |
| 5 | 41.201 | 41.226 | | 10 | inner parity |
| 5 | 41.226 | 41.64 | sector 7 | 172 | data |
| 5 | 41.64 | 41.664 | | 10 | inner parity |
| 5 | 41.664 | 42.079 | sector 8 | 172 | data |
| 5 | 42.079 | 42.103 | | 10 | inner parity |
| 5 | 42.103 | 42.517 | sector 9 | 172 | data |
| 5 | 42.517 | 42.541 | | 10 | inner parity |
| 5 | 42.541 | 42.956 | sector 10 | 172 | data |
| 5 | 42.956 | 42.98 | | 10 | inner parity |
| 5 | 42.98 | 43.394 | sector 11 | 172 | data |
| 5 | 43.394 | 43.418 | | 10 | inner parity |
| 5 | 43.418 | 43.833 | sector 12 | 172 | data |
| 5 | 43.833 | 43.857 | | 10 | inner parity |
| 5 | 43.857 | 44.271 | sector 13 | 172 | data |
| 5 | 44.271 | 44.296 | | 10 | inner parity |
| 5 | 44.296 | 44.71 | sector 14 | 172 | data |
| 5 | 44.71 | 44.734 | | 10 | inner parity |
| 5 | 44.734 | 45.149 | sector 15 | 172 | data |
| 5 | 45.149 | 45.173 | | 10 | inner parity |
| 7 | 45.173 | 45.587 | outer parity | 172 | data |
| 7 | 45.587 | 45.611 | | 10 | inner parity |
| 6 | 45.611 | 46.026 | sector 0 | 172 | data |
| 6 | 46.026 | 46.05 | | 10 | inner parity |
| 6 | 46.05 | 46.464 | sector 1 | 172 | data |
| 6 | 46.464 | 46.488 | | 10 | inner parity |
| 6 | 46.488 | 46.903 | sector 2 | 172 | data |
| 6 | 46.903 | 46.927 | | 10 | inner parity |
| 6 | 46.927 | 47.341 | sector 3 | 172 | data |
| 6 | 47.341 | 47.366 | | 10 | inner parity |
| 6 | 47.366 | 47.78 | sector 4 | 172 | data |
| 6 | 47.78 | 47.804 | | 10 | inner parity |
| 6 | 47.804 | 48.219 | sector 5 | 172 | data |
| 6 | 48.219 | 48.243 | | 10 | inner parity |
| 6 | 48.243 | 48.657 | sector 6 | 172 | data |
| 6 | 48.657 | 48.681 | | 10 | inner parity |
| 6 | 48.681 | 49.096 | sector 7 | 172 | data |
| 6 | 49.096 | 49.12 | | 10 | inner parity |
| 6 | 49.12 | 49.534 | sector 8 | 172 | data |
| 6 | 49.534 | 49.558 | | 10 | inner parity |
| 6 | 49.558 | 49.973 | sector 9 | 172 | data |
| 6 | 49.973 | 49.997 | | 10 | inner parity |
| 6 | 49.997 | 50.411 | sector 10 | 172 | data |
| 6 | 50.411 | 50.436 | | 10 | inner parity |
| 6 | 50.436 | 50.85 | sector 11 | 172 | data |
| 6 | 50.85 | 50.874 | | 10 | inner parity |
| 8 | 50.874 | 51.289 | outer parity | 172 | data |
| 8 | 51.289 | 51.313 | | 10 | inner parity |
| 6 | 51.313 | 51.727 | sector 12 | 172 | data |
| 6 | 51.727 | 51.751 | | 10 | inner parity |
| 6 | 51.751 | 52.166 | sector 13 | 172 | data |
| 6 | 52.166 | 52.19 | | 10 | inner parity |
| 6 | 52.19 | 52.604 | sector 14 | 172 | data |
| 6 | 52.604 | 52.628 | | 10 | inner parity |
| 6 | 52.628 | 53.043 | sector 15 | 172 | data |
| 6 | 53.043 | 53.067 | | 10 | inner parity |
| 7 | 53.067 | 53.481 | sector 0 | 172 | data |
| 7 | 53.481 | 53.506 | | 10 | inner parity |
| 7 | 53.506 | 53.92 | sector 1 | 172 | data |
| 7 | 53.92 | 53.944 | | 10 | inner parity |
| 7 | 53.944 | 54.359 | sector 2 | 172 | data |
| 7 | 54.359 | 54.383 | | 10 | inner parity |
| 7 | 54.383 | 54.797 | sector 3 | 172 | data |
| 7 | 54.797 | 54.821 | | 10 | inner parity |
| 7 | 54.821 | 55.236 | sector 4 | 172 | data |
| 7 | 55.236 | 55.26 | | 10 | inner parity |
| 7 | 55.26 | 55.674 | sector 5 | 172 | data |
| 7 | 55.674 | 55.698 | | 10 | inner parity |
| 7 | 55.698 | 56.113 | sector 6 | 172 | data |
| 7 | 56.113 | 56.137 | | 10 | inner parity |
| 7 | 56.137 | 56.551 | sector 7 | 172 | data |
| 7 | 56.551 | 56.576 | | 10 | inner parity |
| 9 | 56.576 | 56.99 | outer parity | 172 | data |
| 9 | 56.99 | 57.014 | | 10 | inner parity |
| 7 | 57.014 | 57.429 | sector 8 | 172 | data |
| 7 | 57.429 | 57.453 | | 10 | inner parity |
| 7 | 57.453 | 57.867 | sector 9 | 172 | data |
| 7 | 57.867 | 57.891 | | 10 | inner parity |
| 7 | 57.891 | 58.306 | sector 10 | 172 | data |
| 7 | 58.306 | 58.33 | | 10 | inner parity |
| 7 | 58.33 | 58.744 | sector 11 | 172 | data |
| 7 | 58.744 | 58.768 | | 10 | inner parity |
| 7 | 58.768 | 59.183 | sector 12 | 172 | data |
| 7 | 59.183 | 59.207 | | 10 | inner parity |
| 7 | 59.207 | 59.621 | sector 13 | 172 | data |
| 7 | 59.621 | 59.646 | | 10 | inner parity |
| 7 | 59.646 | 60.06 | sector 14 | 172 | data |
| 7 | 60.06 | 60.084 | | 10 | inner parity |
| 7 | 60.084 | 60.499 | sector 15 | 172 | data |
| 7 | 60.499 | 60.523 | | 10 | inner parity |
| 8 | 60.523 | 60.937 | sector 0 | 172 | data |
| 8 | 60.937 | 60.961 | | 10 | inner parity |
| 8 | 60.961 | 61.376 | sector 1 | 172 | data |
| 8 | 61.376 | 61.4 | | 10 | inner parity |
| 8 | 61.4 | 61.814 | sector 2 | 172 | data |
| 8 | 61.814 | 61.838 | | 10 | inner parity |
| 8 | 61.838 | 62.253 | sector 3 | 172 | data |
| 8 | 62.253 | 62.277 | | 10 | inner parity |
| 10 | 62.277 | 62.691 | outer parity | 172 | data |
| 10 | 62.691 | 62.715 | | 10 | inner parity |
| 8 | 62.715 | 63.13 | sector 4 | 172 | data |
| 8 | 63.13 | 63.154 | | 10 | inner parity |
| 8 | 63.154 | 63.569 | sector 5 | 172 | data |
| 8 | 63.569 | 63.593 | | 10 | inner parity |
| 8 | 63.593 | 64.007 | sector 6 | 172 | data |
| 8 | 64.007 | 64.031 | | 10 | inner parity |
| 8 | 64.031 | 64.446 | sector 7 | 172 | data |
| 8 | 64.446 | 64.47 | | 10 | inner parity |
| 8 | 64.47 | 64.884 | sector 8 | 172 | data |
| 8 | 64.884 | 64.908 | | 10 | inner parity |
| 8 | 64.908 | 65.323 | sector 9 | 172 | data |
| 8 | 65.323 | 65.347 | | 10 | inner parity |
| 8 | 65.347 | 65.761 | sector 10 | 172 | data |
| 8 | 65.761 | 65.785 | | 10 | inner parity |
| 8 | 65.785 | 66.2 | sector 11 | 172 | data |
| 8 | 66.2 | 66.224 | | 10 | inner parity |
| 8 | 66.224 | 66.639 | sector 12 | 172 | data |
| 8 | 66.639 | 66.663 | | 10 | inner parity |
| 8 | 66.663 | 67.077 | sector 13 | 172 | data |
| 8 | 67.077 | 67.101 | | 10 | inner parity |
| 8 | 67.101 | 67.516 | sector 14 | 172 | data |
| 8 | 67.516 | 67.54 | | 10 | inner parity |
| 8 | 67.54 | 67.954 | sector 15 | 172 | data |
| 8 | 67.954 | 67.978 | | 10 | inner parity |
| 11 | 67.978 | 68.393 | outer parity | 172 | data |
| 11 | 68.393 | 68.417 | | 10 | inner parity |
| 9 | 68.417 | 68.831 | sector 0 | 172 | data |
| 9 | 68.831 | 68.855 | | 10 | inner parity |
| 9 | 68.855 | 69.27 | sector 1 | 172 | data |
| 9 | 69.27 | 69.294 | | 10 | inner parity |
| 9 | 69.294 | 69.709 | sector 2 | 172 | data |
| 9 | 69.709 | 69.733 | | 10 | inner parity |
| 9 | 69.733 | 70.147 | sector 3 | 172 | data |
| 9 | 70.147 | 70.171 | | 10 | inner parity |
| 9 | 70.171 | 70.586 | sector 4 | 172 | data |
| 9 | 70.586 | 70.61 | | 10 | inner parity |
| 9 | 70.61 | 71.024 | sector 5 | 172 | data |
| 9 | 71.024 | 71.048 | | 10 | inner parity |
| 9 | 71.048 | 71.463 | sector 6 | 172 | data |
| 9 | 71.463 | 71.487 | | 10 | inner parity |
| 9 | 71.487 | 71.901 | sector 7 | 172 | data |
| 9 | 71.901 | 71.925 | | 10 | inner parity |
| 9 | 71.925 | 72.34 | sector 8 | 172 | data |
| 9 | 72.34 | 72.364 | | 10 | inner parity |
| 9 | 72.364 | 72.779 | sector 9 | 172 | data |
| 9 | 72.779 | 72.803 | | 10 | inner parity |
| 9 | 72.803 | 73.217 | sector 10 | 172 | data |
| 9 | 73.217 | 73.241 | | 10 | inner parity |

TABLE 1-continued

Physical Layout of Rows of ECC Block, with approximate location of data row from start of ECC block.

| DATA Row | mm start | mm end | SECTOR | BYTES/TYPE | |
|---|---|---|---|---|---|
| 9 | 73.241 | 73.656 | sector 11 | 172 | data |
| 9 | 73.656 | 73.68 | | 10 | inner parity |
| 12 | 73.68 | 74.094 | outer parity | 172 | data |
| 12 | 74.094 | 74.118 | | 10 | inner parity |
| 9 | 74.118 | 74.533 | sector 12 | 172 | data |
| 9 | 74.533 | 74.557 | | 10 | inner parity |
| 10 | 74.557 | 74.971 | sector 13 | 172 | data |
| 10 | 74.971 | 74.995 | | 10 | inner parity |
| 10 | 74.995 | 75.41 | sector 14 | 172 | data |
| 10 | 75.41 | 75.434 | | 10 | inner parity |
| 10 | 75.434 | 75.848 | sector 15 | 172 | data |
| 10 | 75.848 | 75.873 | | 10 | inner parity |
| 10 | 75.873 | 76.287 | sector 0 | 172 | data |
| 10 | 76.287 | 76.311 | | 10 | inner parity |
| 10 | 76.311 | 76.726 | sector 1 | 172 | data |
| 10 | 76.726 | 76.75 | | 10 | inner parity |
| 10 | 76.75 | 77.164 | sector 2 | 172 | data |
| 10 | 77.164 | 77.188 | | 10 | inner parity |
| 10 | 77.188 | 77.603 | sector 3 | 172 | data |
| 10 | 77.603 | 77.627 | | 10 | inner parity |
| 10 | 77.627 | 78.041 | sector 4 | 172 | data |
| 10 | 78.041 | 78.065 | | 10 | inner parity |
| 10 | 78.065 | 78.48 | sector 5 | 172 | data |
| 10 | 78.48 | 78.504 | | 10 | inner parity |
| 10 | 78.504 | 78.918 | sector 6 | 172 | data |
| 10 | 78.918 | 78.943 | | 10 | inner parity |
| 10 | 78.943 | 79.357 | sector 7 | 172 | data |
| 10 | 79.357 | 79.381 | | 10 | inner parity |
| 13 | 79.381 | 79.796 | outer parity | 172 | data |
| 13 | 79.796 | 79.82 | | 10 | inner parity |
| 10 | 79.82 | 80.234 | sector 8 | 172 | data |
| 10 | 80.234 | 80.258 | | 10 | inner parity |
| 10 | 80.258 | 80.673 | sector 9 | 172 | data |
| 10 | 80.673 | 80.697 | | 10 | inner parity |
| 10 | 80.697 | 81.111 | sector 10 | 172 | data |
| 10 | 81.111 | 81.135 | | 10 | inner parity |
| 10 | 81.135 | 81.55 | sector 11 | 172 | data |
| 10 | 81.55 | 81.574 | | 10 | inner parity |
| 10 | 81.574 | 81.988 | sector 12 | 172 | data |
| 10 | 81.988 | 82.013 | | 10 | inner parity |
| 11 | 82.013 | 82.427 | sector 13 | 172 | data |
| 11 | 82.427 | 82.451 | | 10 | inner parity |
| 11 | 82.451 | 82.866 | sector 14 | 172 | data |
| 11 | 82.866 | 82.89 | | 10 | inner parity |
| 11 | 82.89 | 83.304 | sector 15 | 172 | data |
| 11 | 83.304 | 83.328 | | 10 | inner parity |
| 11 | 83.328 | 83.743 | sector 0 | 172 | data |
| 11 | 83.743 | 83.767 | | 10 | inner parity |
| 11 | 83.767 | 84.181 | sector 1 | 172 | data |
| 11 | 84.181 | 84.205 | | 10 | inner parity |
| 11 | 84.205 | 84.62 | sector 2 | 172 | data |
| 11 | 84.62 | 84.644 | | 10 | inner parity |
| 11 | 84.644 | 85.058 | sector 3 | 172 | data |
| 11 | 85.058 | 85.083 | | 10 | inner parity |
| 14 | 85.083 | 85.497 | outer parity | 172 | data |
| 14 | 85.497 | 85.521 | | 10 | inner parity |
| 11 | 85.521 | 85.936 | sector 4 | 172 | data |
| 11 | 85.936 | 85.96 | | 10 | inner parity |
| 11 | 85.96 | 86.374 | sector 5 | 172 | data |
| 11 | 86.374 | 86.398 | | 10 | inner parity |
| 11 | 86.398 | 86.813 | sector 6 | 172 | data |
| 11 | 86.813 | 86.837 | | 10 | inner parity |
| 11 | 86.837 | 87.251 | sector 7 | 172 | data |
| 11 | 87.251 | 87.275 | | 10 | inner parity |
| 11 | 87.275 | 87.69 | sector 8 | 172 | data |
| 11 | 87.69 | 87.714 | | 10 | inner parity |
| 11 | 87.714 | 88.128 | sector 9 | 172 | data |
| 11 | 88.128 | 88.153 | | 10 | inner parity |
| 11 | 88.153 | 88.567 | sector 10 | 172 | data |
| 11 | 88.567 | 88.591 | | 10 | inner parity |
| 11 | 88.591 | 89.006 | sector 11 | 172 | data |
| 11 | 89.006 | 89.03 | | 10 | inner parity |
| 11 | 89.03 | 89.444 | sector 12 | 172 | data |
| 11 | 89.444 | 89.468 | | 10 | inner parity |
| 11 | 89.468 | 89.883 | sector 13 | 172 | data |
| 11 | 89.883 | 89.907 | | 10 | inner parity |
| 11 | 89.907 | 90.321 | sector 14 | 172 | data |
| 11 | 90.321 | 90.345 | | 10 | inner parity |
| 11 | 90.345 | 90.76 | sector 15 | 172 | data |
| 11 | 90.76 | 90.784 | | 10 | inner parity |
| 15 | 90.784 | 91.198 | outer parity | 172 | data |
| 15 | 91.198 | 91.223 | | 10 | inner parity |

Figure 8:
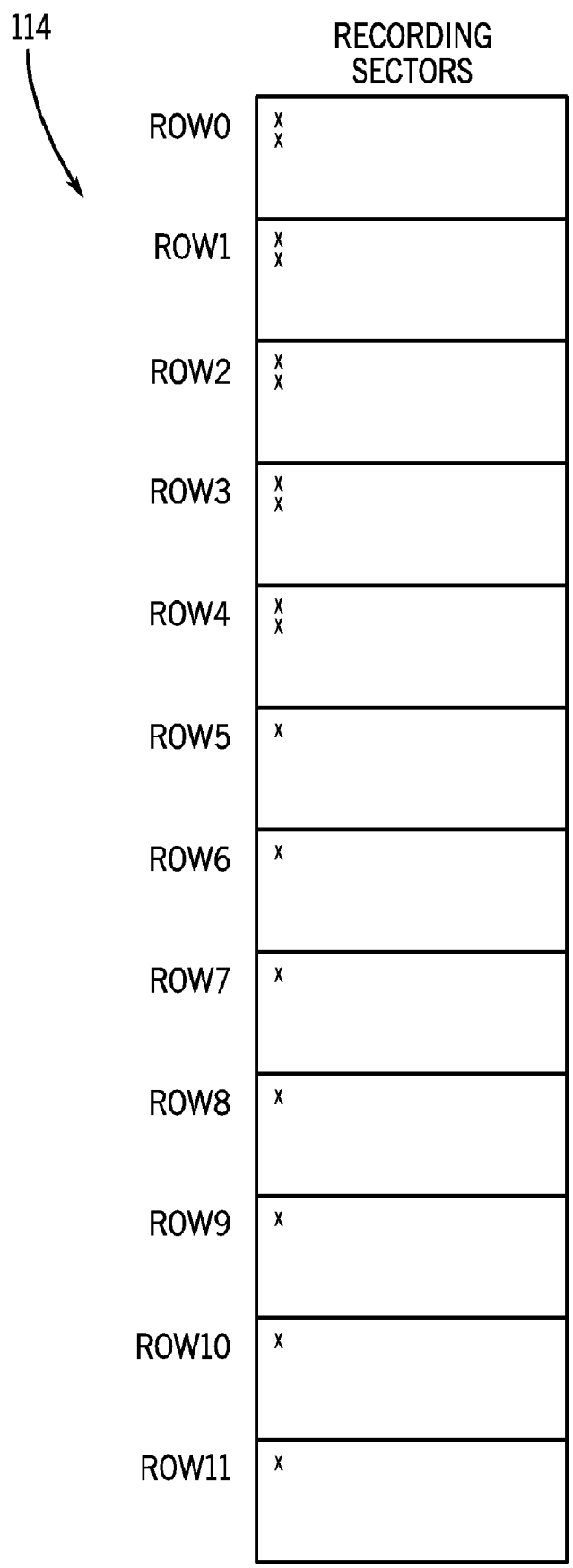
Figure 9:
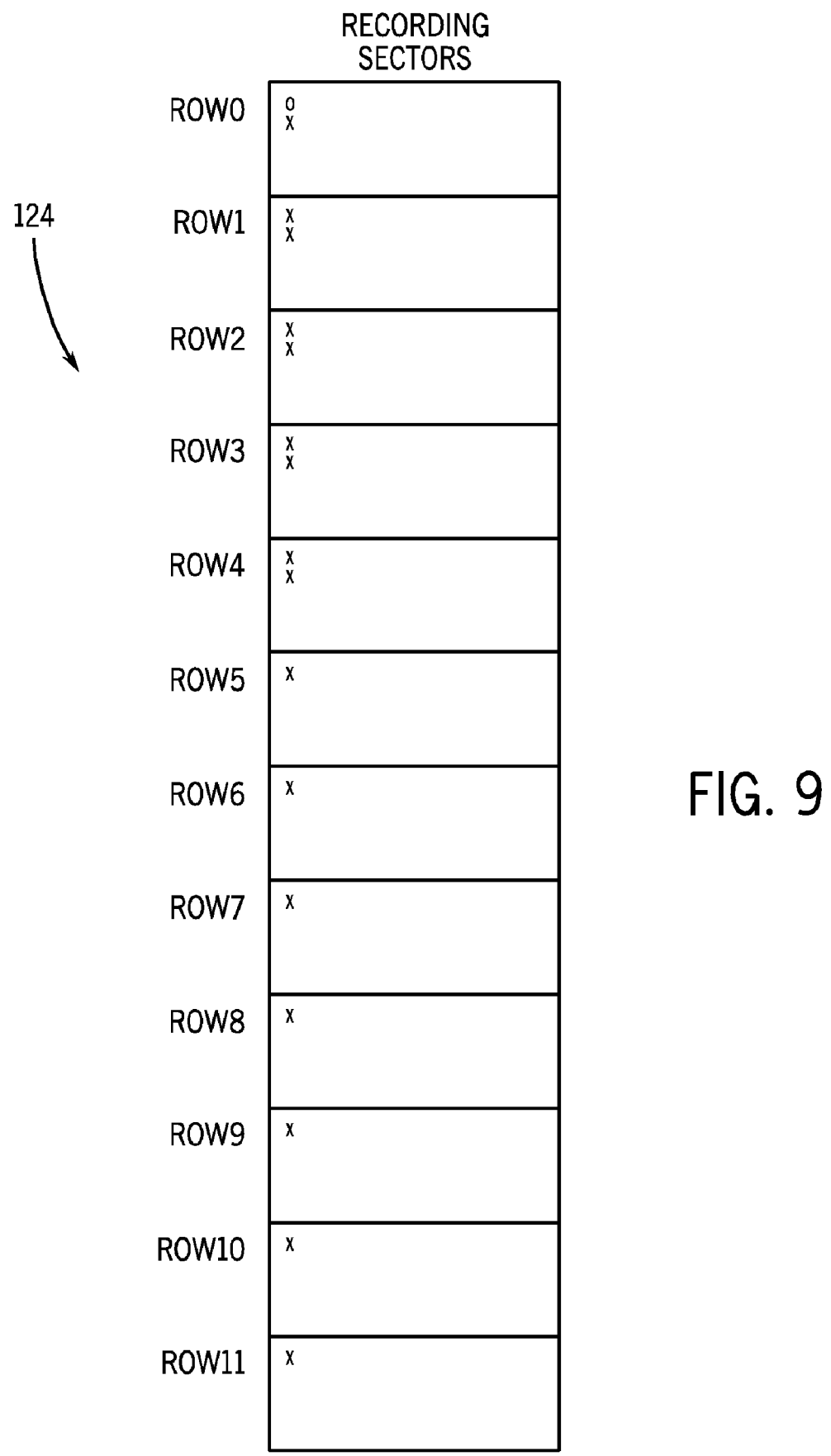
Figure 10:
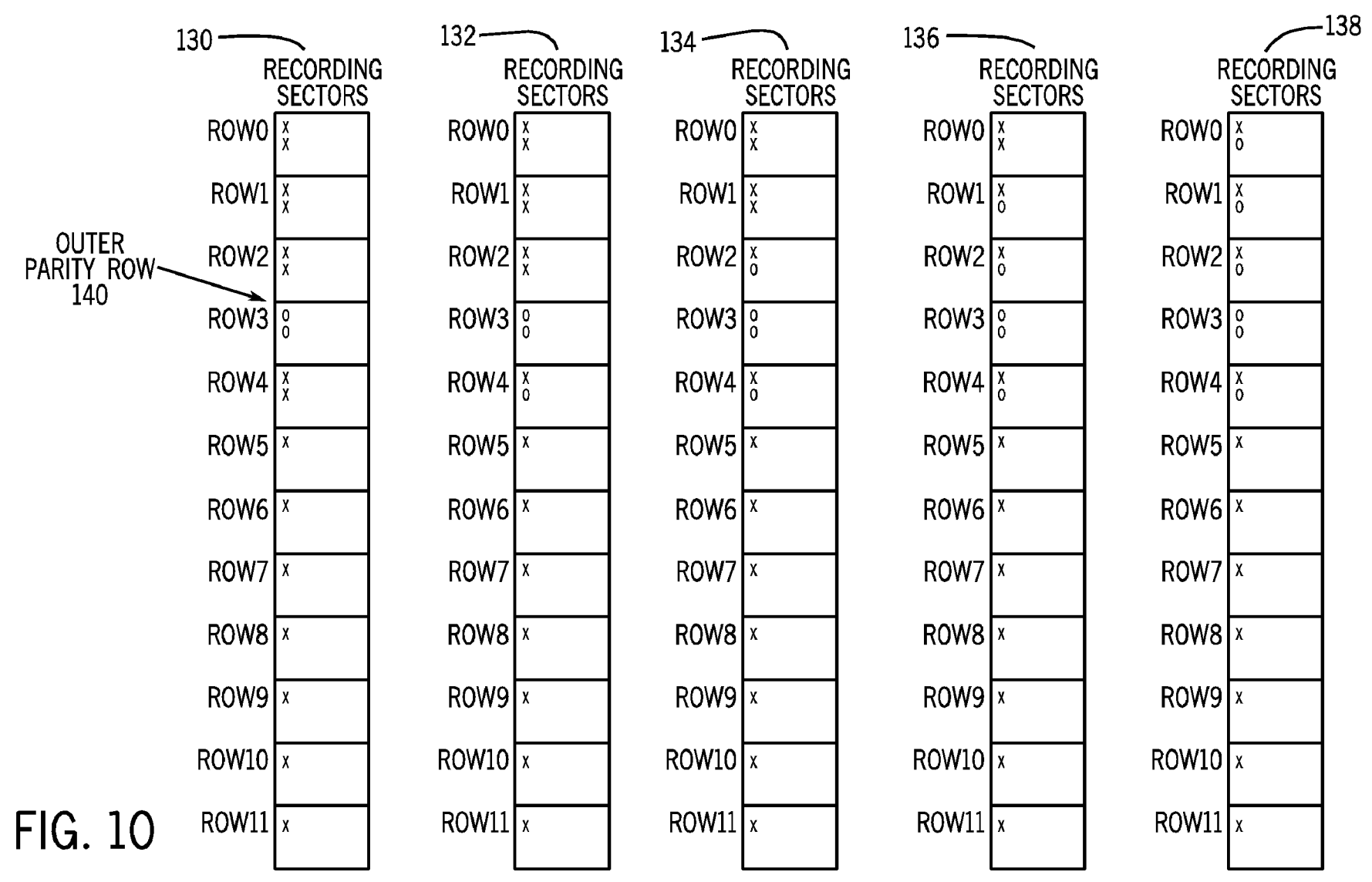
Figure 11:
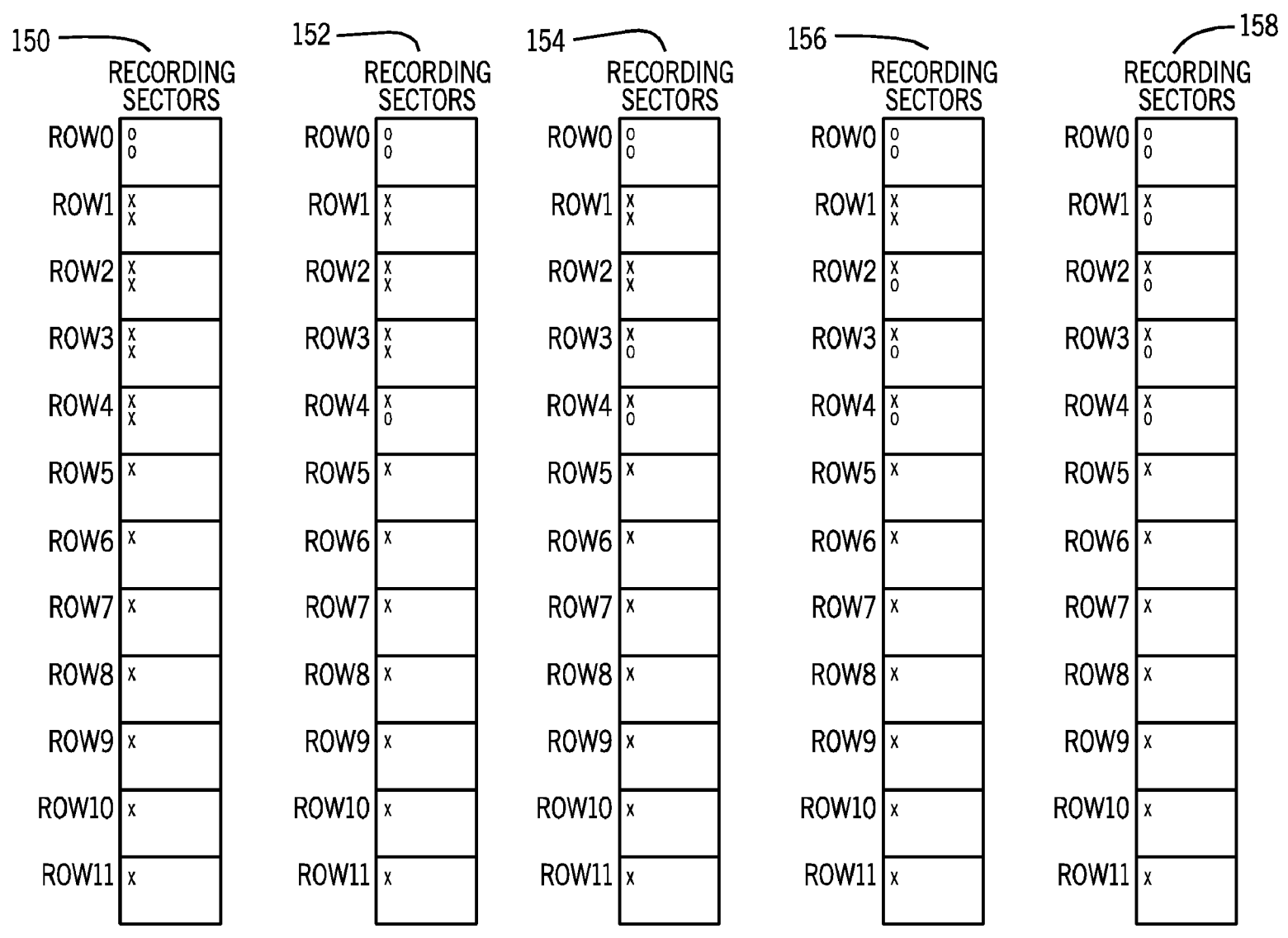
Figure 12:
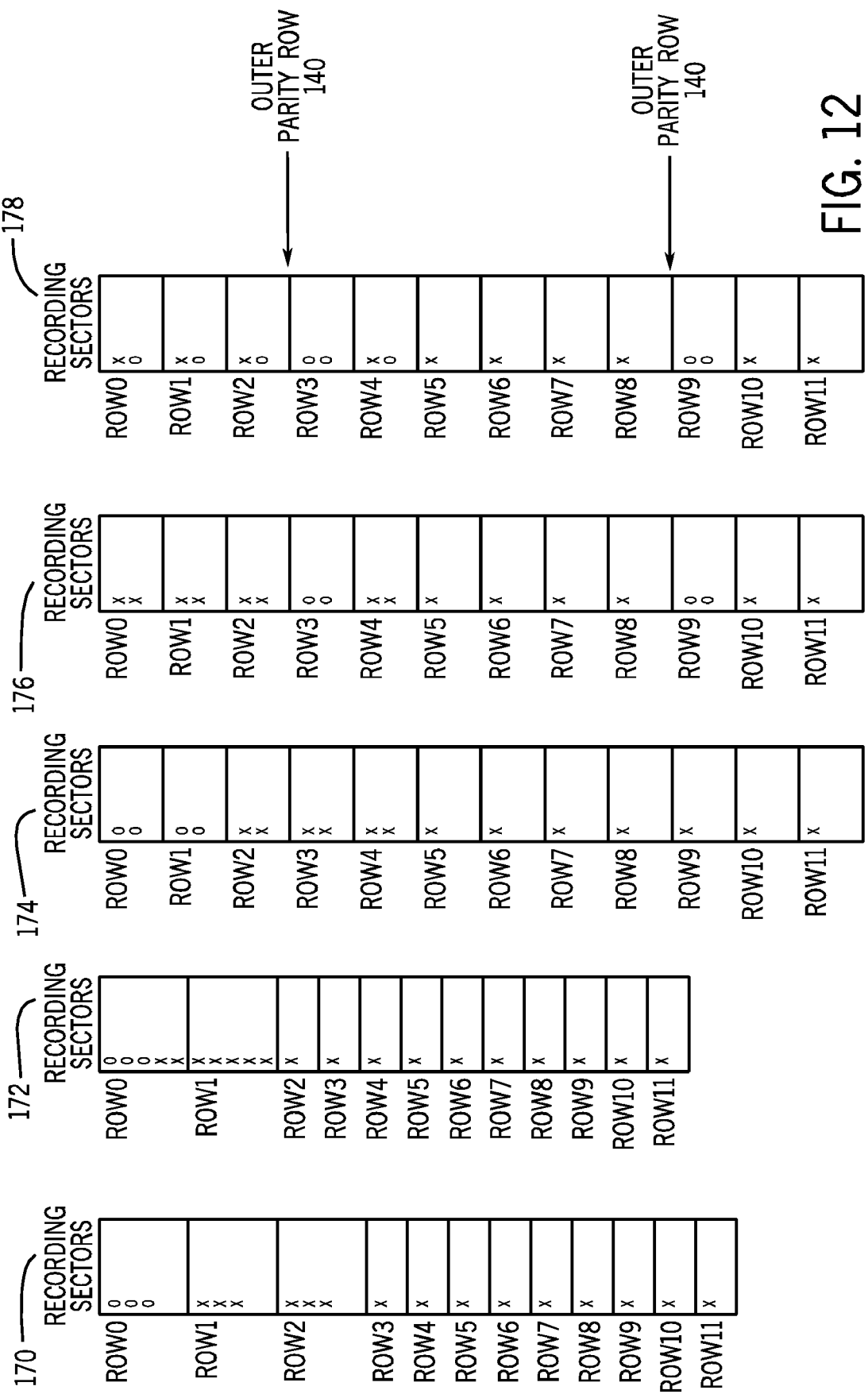

A scan of Table 1 indicates that the ECC block stretches over ~90 linear millimeters, and the data from sector 0 is spread uniformly throughout that distance. While Table 1 may seem complicated, a simplified physical picture of an ECC block (or "recording sector") with its rows and columns can be drawn. Such simplified representations are given in FIGS. 8-12. FIGS. 8 and 9 depict representations of exemplary error correction schemes 114 and 124, respectively. FIG. 10 depicts exemplary error correction schemes 130, 132, 134, 136, and 138. Further, FIG. 11 depicts exemplary error correction schemes 150, 152, 154, 156, and 158. Lastly, FIG. 12 depicts exemplary correction schemes 170, 172, 174, 176, and 178. It should be noted that the representations of exemplary error schemes are not meant to be presented physically to scale. For example, the font sizes of the X's and O's in the figures may not be to scale with regard to the number of rows in a given data sector.

FIG. 8 shows an exemplary minimum or lowest corruption level via pre-mastered errors to render sector 0 of an ECC block uncorrectable. In the illustrative example of FIG. 8, an "x" represents an area of data that is corrupted in the pre-mastered error step. Again, columns 0-10 of rows 0-16 are corrupted in these examples. Eleven columns (of the 172 in the data sector) may be corrupted for all of the rows in sector 0 and 5 of the rows in sector 1 of the ECC block.

The approximate physical location of the corruptions is apparent in FIG. 8. If a typical player were reading along the linear dimension of the DVD track, it would see the first x (corrupted data—row 0 of data sector 0) in the first row of the recording sector, then the rest of the data row and parity data, then move to the next row of the recording sector and see the next x (corrupted data—row 0 of data sector 1), then see the rest of the row and parity data. After that, the player would typically read the next 10 rows of the recording sector (row 0 of data sectors 2-11). After these sectors the player would generally see the third x (corrupted data—row 1 of data sector 0), then the rest of the data row and parity data, then move to the next row of the recording sector and see the next x (corrupted data—row 1 of data sector 1), then see the rest of the row and parity data, etc. In this example, only the first 5 rows of sector 1 are partially corrupted, while all of the rows in sector 0 are partially corrupted. Since only columns 0-10 out of 172 are corrupted, the x's only occupy the left side of the recording sectors.

FIG. 9 presents a representation of the scheme 124 to have a permanent irreversible spot or a bleachable spot with creating a reversibly corruptible sector. In the illustrative example of FIG. 9, one can start with the minimum column 0-10, row 0-16 corruption and leave one row "uncorrupted", as depicted. In FIG. 9, the "o" (reference numeral 126) represents the piece of data that needs to be covered with the permanent irreversible mark or the bleachable spot to give the reversibly corruptible sector. Test discs were created with corruption scheme 124 and printed with bleachable spots. This scheme worked well in many set-top DVD players, but as mentioned previously, due to slight differences in error decoding (e.g., as shown in FIGS. 4-7 above) certain players were not able to correct the critical sector when the spot was in the bleached state. Thus, more corruption schemes were evaluated.

A problem with the exemplary corruption scheme of FIG. 9 may be that even when the spot is bleached, there are 16 uncorrectable rows in the ECC block. FIG. 5 above shows there generally can only be 14 corrupted rows in this example. A problem to solve is the issue of how to "uncorrupt" or subtract three rows from the corruption scheme shown in FIG. 8, but still advantageously cover them with only one printed spot. The subtraction of 2 rows may be beneficial. For example, starting with FIG. 8 and leaving row 0 of sectors 0 and 1 non-corrupted (i.e., two circles at the top), the entirety of these 2 rows could be covered with a single spot that is only ~0.87 mm long (see the first 2 rows of Table 2). However, adding a third non-corrupted row may require a separate spot in a different physical location.

Consideration of the physical location of the outer parity rows in the recording sector may contribute to a solution. A scan of Table 1 indicates that a row of outer parity data immediately precedes data row 3 of sectors 0 and 1 in the ECC block. Thus, if starting with the corruption scheme as shown in FIG. 8, and leaving row 3 of sectors 0 and 1 as non-corrupted, three rows of data could be covered with a spot that is less than 1.5 mm long. It is believed fewer data rows could be corrupted because of corrupting an outer parity row with the printed spot. This concept was tested with the series of corruption schemes 130, 132, 134, 136, and 138 shown in FIG. 10.

In an embodiment, the exemplary corruption scheme 132 in FIG. 10 was found to be beneficial in grouping the most information closest together physically to cover the most rows of critical data with the smallest possible spot. The behavior of corruption scheme 132 was confirmed experimentally with several printing trials. In sum, exemplary scheme 132 reduces the spot size required to corrupt the sector when the spot is in the dark state and generally keeps the sector universally correctable when the spot is in the bleached state.

A similar set of tests were performed with corruption schemes 150, 152, 154, 156, and 158 represented in FIG. 11. However, these tests generally did not perform as well as those depicted in FIG. 10. In general, a larger printed spot was required to corrupt the sector in the schemes of FIG. 11 (as compared to FIG. 10) when the coating was in the dark (non-bleached) state.

In most all of the error schemes above, it is observed that both sectors 0 and 1 of the ECC block are corrupted when the spot is in the dark state. Two schemes were constructed in an effort to localize the corruption to sector 0. These schemes 170 and 172 are shown in FIG. 12. In scheme 170, extra errors were added to the rows for sectors 0, 1, and 2. In element 172, several "extra" errors were added to rows 0 and 1 for sectors 0-5 of the ECC block. In both cases, the sectors were uncorrectable with no coatings, so they did not function. FIG. 12 also shows error schemes M, N, and O that would generally require two printed spots to corrupt the sector. An approach with these schemes was to make the disc more robust to damage such as scratches, and so on. It is generally unlikely that there would be damage (e.g., scratches) in the exact area that the two spots would need to be. The schemes 170, 172, 174, 176, and 178 are prophetic in that they were built into a test disc but remain untested.

In yet another embodiment, the optical article is a Blu-ray disc (BD). Blu-ray players operate with a laser wavelength of 405 nm. On a Blu-ray disc, data within an error correction code (ECC) cluster is first partially corrupted. Further, a physical or a printed mark can be disposed in a pre-determined relationship to the ECC cluster of the Blu-ray disc to make a portion of the data within the ECC cluster unreadable. Finally, the combination of the partial corruption and the printed or physical mark would make a data frame (or, equivalently, sector) uncorrectable. The initial partial corruption is done in such a way to allow for a single continuous printed or physical mark to obscure enough data to make the data frame (sector) uncorrectable.

Data on a BD is divided into discrete subunits, called data frames. Those skilled in the art also refer to BD data frames as "sectors." Error correction is the same for all BD formats. Data is recorded in 64K partitions, called clusters, each containing 32 data frames with 2048 bytes of user data each. 64 KB clusters are protected by two error-correction mechanisms. The first is a long distance code (LDC) using Reed-Solomon (RS) in a (248, 216, 33) structure. The second error-correction mechanism multiplexes the data with a burst indicator subcode (BIS) using (62, 30, 33) Reed-Solomon codewords. BIS includes addressing information and application-dependent control data information (18 bytes per data frame). BIS pinpoints long burst errors that can then be removed to improve LDC error correction A BD data frame holds 2048 bytes of user data and 4 bytes of simple error detection code (EDC) for a total of 2052 bytes. Each data frame is scrambled to spread the bits around. Then, 32 data frames are combined into a data block with 216 rows of 304 columns. Each column is one byte. A data block is extended into an LDC block by appending the LDC codes for the data block as 32 rows of 304 columns. The LDC block is internally interleaved and shifted to improve burst error correction, resulting in an LDC cluster of 152 columns and 496 rows.

The 64 KB physical cluster is divided into 16 address units (AU). The 4-byte address unit numbers are derived from the physical sector numbers and together with 1 byte of flags, 4 bytes of error correction, and user control data, they make up the data used for the BIS, which goes through a RS (62, 30, 33) coding and is arranged into a BIS cluster of 496 rows by 3 columns.

The LDC cluster is split into four groups of 38 columns, and each of the three columns from the BIS cluster is inserted between them, forming an ECC cluster. An additional column of frame sync bits is added at the beginning of the ECC cluster and DC control bits are inserted to form a BD recording frame of 496 rows by 155 columns, also called a physical cluster.

In conclusion, there are a wide number of possible corruption schemes that may function. With the present technique, an approach to pursue error schemes that reversibly corrupt a sector with a small bleachable spot through starting with a small error scheme (e.g., FIG. 8) and "uncorrupting" (i.e., leaving as non-corrupted) the appropriate rows that are close enough together physically to reduce the spot size.

APPENDIX

Measurement of Errors

Error measurement evaluates inner parity errors, inner parity failures, outer parity errors, and outer parity failures. A row in an ECC block that has at least one byte in error will generate an inner parity (PI) error. Inner parity generation allows for at least 5 defective bytes in each line. If there are more than ~5 defective bytes in each line, then the errors cannot be corrected with the inner parity data, and this is called an inner parity failure. Inner parity errors (PIE) and inner parity failures (PIF) were evaluated using the shareware program KProbe. This program scans for parity mismatches, and provides a chart of inner parity errors and inner parity failures vs. sector.

If there is an inner parity failure, the decoder will pass to the outer parity bytes, and will attempt to correct the data using the outer parity rows. If there is an outer parity failure, then the sector is uncorrectable/unreadable. The number of outer parity mismatches before the sector becomes uncorrectable is believed to be variable. Outer parity failures/uncorrectable sectors can be viewed using the data archiving program Isobuster (of Smart Projects), which allows evaluation of the individual sector makeup and determination if a sector is correctable/readable or not. Isobuster basically gives a yes/no if an individual sector is correctable/readable, and the test is performed manually on each sector (i.e., it is not automated to scan multiple sectors in a single test).

The invention claimed is:

1. An optical article for playback in a player, the optical article comprising:
   at least one sector comprising data;
   a mark in a pre-determined relationship with the at least one sector, wherein the mark is configured to transform from a first optical state to a second optical state upon exposure to an external stimulus, and wherein the mark renders a portion of the data unreadable in the first optical state and readable in the second optical state; and
   error correction code associated with the at least one sector, wherein the error correction code associated with the at least one sector is configured as partially corrupted such that when the mark is in the first optical state, the data of the at least one sector is uncorrectable by the error correction code and unplayable by the player, and when the mark is in the second optical state, the data is able to be played by the player.

2. The optical article of claim 1, wherein configuration of the error correction code as partially corrupted reduces a size of the mark required to render the data of the at least one sector uncorrectable.

3. The optical article of claim 1, wherein sectors in data tracks radially adjacent to the at least one sector are partially obscured by the mark but remain correctable by additional error correction code associated with the sectors in data tracks radially adjacent to the at least one sector when the mark is in the first optical state.

4. The optical article of claim 1, wherein the error correction code associated with the at least one sector is partially corrupted with one or more parity mismatches.

5. The optical article of claim 1, wherein the error correction code associated with the at least one sector is partially corrupted with a pre-mastered error.

6. The optical article of claim 1, wherein the error correction code associated with the at least one sector is partially corrupted with irresolvable values.

7. The optical article of claim 1, wherein the mark covers at least a portion of the data of the at least one sector.

8. The optical article of claim 1, wherein the player comprises a laser emitting wavelengths from about 635 nm to about 650 nm at an intensity from about 5 mW to about 10 mW.

9. The optical article of claim 1, wherein the player comprises a laser emitting wavelengths from about 400 nm to about 410 nm.

10. The optical article of claim 1, wherein the mark comprises a topical coating or a printed mark, or a combination thereof.

11. The optical article of claim 1, wherein the mark is configured to substantially irreversibly transform from the first optical state to the second optical state upon exposure to the external stimulus.

12. The optical article of claim 1, wherein the mark is configured to transform from the first optical state to the second optical state upon exposure to a light source of the player.

13. The optical article of claim 12, wherein the mark comprises a bleachable compound, and the second optical state corresponds to a bleached state.

14. The optical article of claim 1, wherein the external stimulus comprises light, heat, or electrical potential, or any combination thereof.

15. An optical article for playback in a player, the optical article comprising:
    at least one sector comprising a command;
    a mark disposed in a pre-determined relationship with the at least one sector, wherein the mark is configured to transform from a first optical state to a second optical state upon exposure to an external stimulus, and wherein the mark renders the command unreadable in the first optical state and readable in the second optical state; and
    error correction code associated with the at least one sector, wherein the error correction code associated with the at least one sector is configured as partially corrupted such that when the mark is in the first optical state, the command of the at least one sector is uncorrectable by the error correction code and is unable to be executed by the player, and when the mark is in the second optical state, the command is able to be executed by the player.

16. The optical article of claim 15, wherein the configuration of the error correction code as partially corrupted reduces a size of the mark required to render the command of the at least one sector uncorrectable by the error correction code.

17. The optical article of claim 15, wherein sectors in data tracks radially adjacent to the at least one sector are partially obscured by the mark but remain correctable by additional error correction code associated with the sectors in data tracks radially adjacent to the at least one sector when the mark is in the first optical state.

18. The optical article of claim 15, wherein the error correction code associated with the at least one sector is partially corrupted with a pre-mastered error.

19. The optical article of claim 15, wherein the error correction code associated with the at least one sector is partially corrupted with a parity mismatch.

20. The optical article of claim 15, wherein the error correction code associated with the at least one sector is partially corrupted with an uncorrectable error.

21. The optical article of claim 15, wherein the player comprises a laser emitting wavelengths from about 635 nm to about 650 nm.

22. The optical article of claim 15, wherein the player comprises a laser emitting wavelengths from about 400 nm to about 410 nm.

23. The optical article of claim 15, wherein the external stimulus comprises light, heat, or electrical potential, or any combination thereof.

24. The optical article of claim 15, wherein the mark is configured to transform from the first optical state to the second optical state upon exposure to a light source of the player, and wherein the second optical state corresponds to a bleached state.

25. A method of manufacturing an optical article for playback in a player, comprising:
providing data on at least one sector of the optical article;
providing error correction code on the optical article, wherein the error correction code is associated with the at least one sector;
partially corrupting the error correction code associated with the at least one sector; and
disposing a mark in a pre-determined relationship with the at least one sector, wherein the mark is configured to transform from a first optical state to a second optical state upon exposure to an external stimulus such that when the mark is in the first optical state, the mark renders the data of the at least one sector unreadable and when the mark is in the second optical state, the data is able to be read; and
wherein the combination of partial corruption of the error correction code and the mark in the first optical state renders the at least one sector uncorrectable such that the data is unable to be played in the player, and the combination of partial corruption of the error correction code and the mark in the second optical state enables playback of the data in the player.

26. The method of claim 25, wherein partially corrupting the error correction code associated with the at least one sector comprises corrupting the error correction code with a parity mismatch.

27. The method of claim 25, wherein partially corrupting the error correction code associated with the at least one sector comprises corrupting the error correction code during mastering of the optical article.

28. The method of claim 25, wherein corrupting the error correction code reduces a size of the mark in the first optical state required to render the data of the at least one sector uncorrectable.

29. The method of claim 25, wherein sectors in the data tracks radially adjacent to the at least one sector are also partially covered by the mark but are fully correctable.

30. The method of claim 25, wherein unreadable comprises unreadable by a laser of the player.

31. The method of claim 25, wherein the mark is not bleachable.

32. The method of claim 25, wherein the mark is bleachable.

* * * * *